United States Patent
Gong et al.

(10) Patent No.: US 10,692,311 B2
(45) Date of Patent: *Jun. 23, 2020

(54) SYSTEMS AND METHODS FOR MONITORING FLIGHT

(71) Applicant: SZ DJI TECHNOLOGY CO., LTD., Shenzhen (CN)

(72) Inventors: Ming Gong, Shenzhen (CN); Jin Dai, Shenzhen (CN); Hao Cui, Shenzhen (CN); Xiaodong Wang, Shenzhen (CN); Han Huang, Shenzhen (CN); Jun Wu, Shenzhen (CN); Wei Fan, Shenzhen (CN); Ning Ma, Shenzhen (CN); Xinhua Rong, Shenzhen (CN); Xingsen Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 112 days.

This patent is subject to a terminal disclaimer.

(21) Appl. No.: 15/850,986

(22) Filed: Dec. 21, 2017

(65) Prior Publication Data

US 2018/0137694 A1    May 17, 2018

Related U.S. Application Data

(63) Continuation of application No. 15/267,482, filed on Sep. 16, 2016, now Pat. No. 9,875,584, which is a (Continued)

(51) Int. Cl.
*G07C 5/08* (2006.01)
*G05D 1/00* (2006.01)
(Continued)

(52) U.S. Cl.
CPC ............ *G07C 5/085* (2013.01); *B64C 9/00* (2013.01); *B64C 39/024* (2013.01); *B64D 45/00* (2013.01);
(Continued)

(58) Field of Classification Search
CPC .................................................. G07C 5/085
See application file for complete search history.

(56) References Cited

U.S. PATENT DOCUMENTS

| 6,044,062 A | * | 3/2000 | Brownrigg | ............. H04L 29/06 370/238 |
| 6,067,488 A | * | 5/2000 | Tano | ..................... G07C 5/085 701/33.4 |

(Continued)

FOREIGN PATENT DOCUMENTS

| CN | 1237263 A | 12/1999 |
| CN | 1366751 A | 8/2002 |

(Continued)

OTHER PUBLICATIONS

The European Patent Office (EPO) European Search Report and Search Opinion for Application No. 15874403.7 dated Jun. 20, 2017.

(Continued)

*Primary Examiner* — Bao Long T Nguyen
*Assistant Examiner* — Michael A Berns
(74) *Attorney, Agent, or Firm* — Anova Law Group, PLLC

(57) ABSTRACT

A device for recording user operation data for a remotely controlled vehicle includes a memory off-board the remotely controlled vehicle and a housing receiving the memory. The memory is configured to record user operation data comprising outgoing operation commands that affect operation of the remotely controlled vehicle. The outgoing operation commands are received via a remote controller of the remotely controlled vehicle and transmitted to the remotely controlled vehicle. The housing is removable from the remote controller and more resistant to destruction than the rest of the remote controller.

19 Claims, 9 Drawing Sheets

Related U.S. Application Data continuation of application No. PCT/CN2015/075614, filed on Mar. 31, 2015.

(51) Int. Cl.
| | | |
|---|---|---|
| *B64D 45/00* | (2006.01) | |
| *B64C 9/00* | (2006.01) | |
| *B64C 39/02* | (2006.01) | |
| *G06F 21/31* | (2013.01) | |
| *G07C 5/00* | (2006.01) | |
| *G05D 1/10* | (2006.01) | |

(52) U.S. Cl.
CPC ............ *G05D 1/00* (2013.01); *G05D 1/0011* (2013.01); *G05D 1/0022* (2013.01); *G05D 1/0055* (2013.01); *G05D 1/102* (2013.01); *G06F 21/31* (2013.01); *G07C 5/004* (2013.01); *G07C 5/008* (2013.01); *B64C 2201/027* (2013.01); *B64C 2201/146* (2013.01); *G07C 5/0825* (2013.01)

(56) References Cited

U.S. PATENT DOCUMENTS

| | | | |
|---|---|---|---|
| 6,076,026 A | 6/2000 | Jambhekar et al. | |
| 6,175,784 B1 | 1/2001 | Jicha et al. | |
| 6,278,913 B1 | 8/2001 | Jiang | |
| 8,077,016 B2* | 12/2011 | Cohen .................... | G08C 17/02 340/309.16 |
| 8,121,752 B2* | 2/2012 | Winterhalter .......... | B64D 45/00 174/544 |
| 8,924,044 B1 | 12/2014 | Wang et al. | |
| 9,195,397 B2* | 11/2015 | Winokur ............... | G06F 3/0619 |
| 9,262,650 B2 | 2/2016 | Nimura et al. | |
| 9,783,293 B2* | 10/2017 | Srivastava ............ | B64C 39/024 |
| 2003/0135327 A1* | 7/2003 | Levine ................. | G01C 21/165 701/500 |
| 2004/0189454 A1* | 9/2004 | Shimoyama ........... | G07C 5/085 340/436 |
| 2007/0096945 A1 | 5/2007 | Rasmussen et al. | |
| 2007/0244608 A1 | 10/2007 | Rath et al. | |
| 2008/0154493 A1 | 6/2008 | Bitar et al. | |
| 2010/0225457 A1 | 9/2010 | Aguirre | |
| 2011/0149849 A1* | 6/2011 | Brownrig ................ | H04L 45/00 370/328 |
| 2011/0301784 A1 | 12/2011 | Oakley et al. | |
| 2012/0066325 A1 | 3/2012 | Heredia | |
| 2013/0244588 A1 | 9/2013 | Pereira | |
| 2013/0318214 A1 | 11/2013 | Tebay et al. | |
| 2014/0159866 A1 | 6/2014 | Hwang | |
| 2014/0309879 A1* | 10/2014 | Ricci ....................... | H04W 4/21 701/36 |
| 2015/0031268 A1 | 1/2015 | Waites et al. | |
| 2015/0336667 A1 | 11/2015 | Srivastava et al. | |
| 2016/0093124 A1* | 3/2016 | Shi ........................ | B64D 47/08 701/2 |
| 2016/0140851 A1 | 5/2016 | Levy et al. | |
| 2017/0004662 A1* | 1/2017 | Gong ..................... | B64C 9/00 |
| 2018/0044034 A1* | 2/2018 | Newman ................ | B64D 45/00 |

FOREIGN PATENT DOCUMENTS

| | | |
|---|---|---|
| CN | 1986374 A | 6/2007 |
| CN | 101013308 A | 8/2007 |
| CN | 101388141 A | 3/2009 |
| CN | 101410860 A | 4/2009 |
| CN | 101751033 A | 6/2010 |
| CN | 102183945 A | 9/2011 |
| CN | 202166892 U | 3/2012 |
| CN | 102427472 A | 4/2012 |
| CN | 102497477 A | 6/2012 |
| CN | 102621903 A | 8/2012 |
| CN | 102737416 A | 10/2012 |
| CN | 102955456 A | 3/2013 |
| CN | 102968484 A | 3/2013 |
| CN | 103080954 A | 5/2013 |
| CN | 1459619 A | 12/2013 |
| CN | 103440211 A | 12/2013 |
| CN | 203415013 U | 1/2014 |
| CN | 104238551 A | 12/2014 |
| CN | 104321708 A | 1/2015 |
| CN | 204119397 U | 1/2015 |
| CN | 104332053 A | 2/2015 |
| GB | 2327018 A | 1/1999 |
| JP | S62137097 U | 8/1987 |
| JP | H06312700 A | 11/1994 |
| JP | H0717492 A | 1/1995 |
| JP | H11129992 A | 5/1999 |
| JP | 2002287816 A | 10/2002 |
| JP | 2004291805 A | 10/2004 |
| JP | 2005216213 A | 8/2005 |
| JP | 2006082775 A | 3/2006 |
| JP | 2007279926 A | 10/2007 |
| JP | 2010273387 A | 12/2010 |
| JP | 2011150516 A | 8/2011 |
| JP | 2014137375 A | 7/2014 |
| WO | 2011113022 A1 | 9/2011 |
| WO | 2012111018 A1 | 8/2012 |

OTHER PUBLICATIONS

The European Patent Office (EPO) European Search Report and Search Opinion for Application No. 15874392.2 dated Jul. 20, 2017.
The World Intellectual Property Organization (WIPO) International Search Report and Written Opinionor Application No. PCT/CN2015/075615 dated Jan. 4, 2016.
The World Intellectual Property Organization (WIPO) International Search Report and Written Opinionor Application No. PCT/CN2015/075614 dated Dec. 16, 2015.

* cited by examiner

Possible Causes for Behavior of Remotely Controlled Vehicle

| | OUTGOING COMMANDS VS. INCOMING COMMANDS | |
|---|---|---|
| | NO DISCREPANCY | DISCREPANCY |
| NO DISCREPANCY (INCOMING COMMANDS VS. VEHICLE STATUS DATA) | - Operation commands sent by user | - Malfunction of communication link<br>- Malfunction of communication module<br>- Hijacking incident |
| DISCREPANCY (INCOMING COMMANDS VS. VEHICLE STATUS DATA) | - Malfunction of vehicle<br>- Disruption in vehicle function by environmental parameter | - Malfunction of vehicle<br>- Disruption in vehicle function by environmental parameter<br>- Malfunction of communication link<br>- Malfunction of communication module<br>- Hijacking incident |

FIG. 7

SYSTEMS AND METHODS FOR MONITORING FLIGHT

CROSS-REFERENCE

The present application is a continuation a U.S. application Ser. No. 15/267,482, filed on Sep. 16, 2016, which is a continuation of PCT Application PCT/CN2015/075614, filed on Mar. 31, 2015, entitled "Systems and Methods for Monitoring Flight," the entire contents of both of which are incorporated herein by reference.

BACKGROUND

Unmanned vehicles, such as unmanned aerial vehicles, have been developed for a wide range of applications including surveillance, search and rescue operations, exploration, and other fields. In some instances, unmanned vehicles may be equipped with sensors for collecting data during flight. For example, unmanned aerial vehicles are commonly provided with sensors for detecting parameters such as speed, altitude, and location of a vehicle.

However, existing approaches for data recordation of unmanned vehicles can be less than ideal. In some instances, the recorded data may not include a complete operation history of a user of the unmanned vehicle. In some instances, the recorded operation data may not provide enough detail to enable an accurate analysis of events that may occur.

SUMMARY

A need exists for improved recordation of operation history with movable objects such as unmanned vehicles. Systems, methods, and devices are provided herein for recording operation history of movable objects. The recorded operation history may comprise outgoing operation commands sent from a remote controller of a remotely controlled vehicle, as well as incoming operation commands received by the remotely controlled vehicle. The recorded operation history may further comprise vehicle status data, such as data related to an operation process of the remotely controlled vehicle. The recorded operation history of a vehicle may be used to analyze a behavior of the vehicle.

In one aspect of the present disclosure, a device for recording user operation data for a remotely controlled vehicle is described. The device may comprise a memory configured to record user operation data, wherein the user operation data recorded by the memory is inaccessible for modification. The user operation data may comprise outgoing operation commands that affect operation of the remotely controlled vehicle. The outgoing operation commands may be transmitted to the remotely controlled vehicle, and received via a remote controller of the remotely controlled vehicle.

In another aspect of the present disclosure, a method for recording user operation data for a remotely controlled vehicle is described. The method comprises receiving, using a user interface of a remote controller, outgoing operation commands, the remote controller comprising a user operation data recorder. The method further comprises recording the user operation data to a memory of the user operation data recorder, the user operation data recorder comprising the outgoing commands. The user operation data recorded to the user operation data recorder may be inaccessible for modification.

In another aspect of the present disclosure, a device for recording user operation data for a remotely controlled vehicle is described. The device comprises a memory configured to record user operation data, wherein the memory is received within a housing that is removable from the remote controller and more resistant to destruction than the rest of the remote controller. The user operation data may comprise outgoing operation commands that affect operation of the remotely controlled vehicle. The outgoing operation commands may be transmitted to the remotely controlled vehicle, and received via a remote controller of the remotely controlled vehicle.

In another aspect of the present disclosure, a method for recording user operation data for a remotely controlled vehicle is described. The method comprises receiving, using a user interface of a remote controller, outgoing operation commands, the remote controller comprising a user operation data recorder. The method further comprises recording the user operation data to a memory of the user operation data recorder, the user operation data recorder comprising the outgoing commands. The memory of the user operation data recorder may be received within a housing that is removable from the remote controller and more resistant to destruction than the rest of the remote controller.

In another aspect of the present disclosure, a device for recording user operation data for a remotely controlled vehicle is described. The device comprises a memory configured to record user operation data, wherein the user operation data recorded by the memory is associated with a specific user of the remotely controlled vehicle. The user operation data may comprise outgoing operation commands that affect operation of the remotely controlled vehicle. The outgoing operation commands may be transmitted to the remotely controlled vehicle, and received via a remote controller of the remotely controlled vehicle.

In another aspect of the present disclosure, a method for recording user operation data for a remotely controlled vehicle is described. The method comprises receiving, using a user interface of a remote controller, outgoing operation commands, the remote controller comprising a user operation data recorder. The method further comprises recording the user operation data to a memory of the user operation data recorder, the user operation data recorder comprising the outgoing commands. The user operation data recorded by the memory may be associated with a specific user of the remotely controlled vehicle.

In some embodiments, a user operation data recorder is physically integrated with a processing unit configured to control operation of the remote controller, such that the remote controller becomes inoperable if the user operation data recorder is tampered with. The user operation data recorder may be integrated with the processing unit in one package, the one package configured to perform a complete function, such that an attempt to separate the user operation data recorder from the one package will destroy functioning of the one package. The user operation data recorder may be adhered to an interconnection substrate and wire-bonded to achieve electrical connection, such that the user operation data recorder cannot be removed from the interconnection substrate without compromising physical integrity of the recorder.

In some embodiments, a user operation data recorder may be integrated via software with a processing unit configured to control operation of the remote controller, such that the remote controller becomes inoperable if the user operation data recorder is tampered with. The processing unit may be implemented with a software version corresponding to a unique identity of the user operation data recorder, such that regular operation of the software of the processing unit requires obtaining the unique identity of the user operation data recorder.

In some embodiments, a memory of a user operation data recorder is received in a housing that comprises a shock-absorbing material and/or a waterproof material.

In some embodiments, a memory of a user operation data recorder comprises an array of multiple disk drives operating as a single logical unit. The memory may be configured to record the user operation data as logically sequential segments, each segment recorded to at least one of the multiple disk drives of the array, such that in the event of failure of a disk drive of the array, the segment recorded to the failed disk drive can be reconstructed using one or more segments recorded to one or more remaining disk drives of the array.

In some embodiments, a housing receiving a memory of a user operation data recorder comprises a tamper-evident structure. The tamper-evident structure may comprise one or more labels adhered to one or more fasteners of the housing, such that an attempt to unfasten the one or more fasteners results in evident physical damage to the label. The tamper-evident structure may comprise one or more fasteners of the housing that are coupled to an electrical circuit, such that an attempt to unfasten the one or more fasteners results in a detected change to the electrical circuit that is recorded to the memory or to a processing unit of the remote controller.

In some embodiments, a user operation data recorder is configured to associate the user operation data with a specific user. The user operation data recorder may be configured to recognize an identity of a specific user entering the outgoing operation commands, and using the identity of the specific user, associate the user operation data with the specific user. Recognizing the identity of the specific user can comprise providing user authentication for each user. The device can be configured to begin recording user operation data once a user has been authenticated, and end recording when the user authentication is terminated. The user operation data for each user may be configured to be distinguished from data for other users via physically separated storage regions. The user operation data for each user may be configured to be distinguished from data for other users via digital means.

In some embodiments, a user operation data recorder further comprises a processing unit configured to receive outgoing operation commands from one or more users of the remotely controlled vehicle, wherein the processing unit is in communication with the memory of the user operation data recorder.

In some embodiments, user operation data recorded by a user operation data recorder further comprises a location of the user. In some embodiments, the user operation data further comprises an identification of the remotely controlled vehicle. The identification may comprise a unique serial number of the remotely controlled vehicle. In some embodiments, the user operation data may be associated with a corresponding time.

In some embodiments, the memory of a user operation data recorder may be a non-volatile memory. In some embodiments, the memory is configured to record data continuously. In some embodiments, the memory is configured to record data periodically at pre-determined intervals.

In some embodiments, a user operation data recorder is further configured to enter an accident mode that prevents updates to the recorder when the recorder is alerted that one or more accident conditions are detected. The one or more accident conditions may be selected from a loss of a global positioning system signal of the vehicle, a loss of a radio connection of the vehicle, vehicle collision, vehicle entry into a restricted area, deviation of a flight path of a vehicle from a projected path, abnormal acceleration of the vehicle, abnormal speed of the vehicle, abnormal temperature of the vehicle, and data from a vision sensor of a vehicle indicating poor visibility. The user operation data recorder may be further configured to exit the accident mode when the recorder receives instructions that the accident condition has been resolved.

In some embodiments, a user operation data recorder may be further configured to upload the user operation data to a database in a management center via a secure connection. The uploading of the user operation data may be performed periodically at pre-set intervals, or may be performed when the user operation data recorder is alerted that one or more accident conditions are detected.

In some embodiments, the remotely controlled vehicle is an unmanned aerial vehicle. The outgoing operation commands may affect flight of the unmanned aerial vehicle, operation of one or more sensors on-board the unmanned aerial vehicle, and/or positioning of a payload on-board the unmanned aerial vehicle with respect to the rest of the unmanned aerial vehicle.

In another aspect of the present disclosure, a remote controller for controlling operation of a remotely controlled vehicle is described, the remote controller comprising a user interface, a communication module, and a device to record user operation data. The user interface may be configured to receive outgoing operation commands, and configured to control operation of the remotely controlled vehicle. The communication module may be configured to transmit the outgoing operation commands from the remote controller to the remotely controlled vehicle. The device to record user operation data may comprise any user operation data recorder described herein.

In another aspect of the present disclosure, a device for recording vehicle operation data for a remotely controlled vehicle is described. The device comprises a memory configured to record vehicle operation data, the vehicle operation data comprising incoming operation commands that affect operation of the remotely controlled vehicle, said incoming operation commands received via a remote controller of the remotely controlled vehicle. The vehicle operation data recorded by the memory may be inaccessible for modification.

In another aspect of the present disclosure, a method for recording vehicle operation data for a remotely controlled vehicle is described. The method comprises receiving, using a communication module of the remotely controlled vehicle, one or more incoming operation commands from a remote controller, wherein the remotely controlled vehicle comprises a vehicle operation data recorder. The method further comprises recording vehicle operation data to a memory of the vehicle operation data recorder, the vehicle operation data comprising the incoming operation commands. The vehicle operation data recorded to the vehicle operation data recorder may be inaccessible for modification.

In another aspect of the present disclosure, a device for recording vehicle operation data for a remotely controlled vehicle is described. The device comprises a memory configured to record vehicle operation data, wherein the memory is received within a housing that is removable from the remotely controlled vehicle and more resistant to destruction than the rest of the remotely controlled vehicle. The vehicle operation data may comprise incoming operation commands that affect operation of the remotely controlled vehicle, said incoming operation commands received via a remote controller of the remotely controlled vehicle.

In another aspect of the present disclosure, a method for recording user operation data for a remotely controlled vehicle is described. The method comprises receiving, using a communication module of the remotely controlled vehicle, one or more incoming operation commands from a remote controller, wherein the remotely controlled vehicle comprises a vehicle operation data recorder. The method further comprises recording vehicle operation data to a memory of the vehicle operation data recorder, the vehicle operation data comprising the incoming operation commands. The memory of the user operation data recorder may be received within a housing that is removable from the remote controller and more resistant to destruction than the rest of the remote controller.

In another aspect of the present disclosure, a device for recording vehicle operation data for a remotely controlled vehicle is described. The device comprises a memory configured to record vehicle operation data, wherein the vehicle operation data recorded by the memory is associated with a specific user of the remotely controlled vehicle. The vehicle operation data may comprise incoming operation commands that affect operation of the remotely controlled vehicle. The incoming operation commands may be transmitted to the remotely controlled vehicle, and received via a remote controller of the remotely controlled vehicle.

In another aspect of the present disclosure, a method for recording user operation data for a remotely controlled vehicle is described. The method comprises receiving, using a communication module of the remotely controlled vehicle, one or more incoming operation commands from a remote controller, wherein the remotely controlled vehicle comprises a vehicle operation data recorder. The method further comprises recording vehicle operation data to a memory of the vehicle operation data recorder, the vehicle operation data comprising the incoming operation commands. The vehicle operation data recorded by the memory may be associated with a specific user of the remotely controlled vehicle.

In some embodiments, a vehicle operation data recorder is physically integrated with a processing unit configured to control operation of the remotely controlled vehicle, such that the remotely controlled vehicle becomes inoperable if the vehicle operation data recorder is tampered with. The vehicle operation data recorder may be integrated with the processing unit in one package, the one package configured to perform a complete function, such that an attempt to separate the vehicle operation data recorder from the one package will destroy functioning of the one package. The vehicle operation data recorder may be adhered to an interconnection substrate and wire-bonded to achieve electrical connection, such that the vehicle operation data recorder cannot be removed from the interconnection substrate without compromising physical integrity of the recorder.

In some embodiments, a vehicle operation data recorder may be integrated via software with a processing unit configured to control operation of the remotely controlled vehicle, such that the remotely controlled vehicle becomes inoperable if the vehicle operation data recorder is tampered with. The processing unit may be implemented with a software version corresponding to a unique identity of the vehicle operation data recorder, such that regular operation of the software of the processing unit requires obtaining the unique identity of the vehicle operation data recorder.

In some embodiments, a memory of a vehicle operation data recorder is received in a housing that comprises a shock-absorbing material and/or a waterproof material.

In some embodiments, a memory of a vehicle operation data recorder comprises an array of multiple disk drives operating as a single logical unit. The memory may be configured to record the vehicle operation data as logically sequential segments, each segment recorded to at least one of the multiple disk drives of the array, such that in the event of failure of a disk drive of the array, the segment recorded to the failed disk drive can be reconstructed using one or more segments recorded to one or more remaining disk drives of the array.

In some embodiments, a housing receiving a memory of a vehicle operation data recorder comprises a tamper-evident structure. The tamper-evident structure may comprise one or more labels adhered to one or more fasteners of the housing, such that an attempt to unfasten the one or more fasteners results in evident physical damage to the label. The tamper-evident structure may comprise one or more fasteners of the housing that are coupled to an electrical circuit, such that an attempt to unfasten the one or more fasteners results in a detected change to the electrical circuit that is recorded to the memory or to a processing unit of the remotely controlled vehicle.

In some embodiments, a vehicle operation data recorder is configured to associate the vehicle operation data with a specific user of the remotely controlled vehicle. The vehicle operation data recorder may be configured to recognize an identity of a specific user entering the outgoing operation commands, and using the identity of the specific user, associate the user operation data with the specific user. Recognizing the identity of the specific user can comprise providing user authentication for each user. The vehicle operation data recorder can be configured to begin recording vehicle operation data once a user has been authenticated, and end recording when the user authentication is terminated. The vehicle operation data for each user may be configured to be distinguished from data for other users via physically separated storage regions. The vehicle operation data for each user may be configured to be distinguished from data for other users via digital means.

In some embodiments, a vehicle operation data recorder further comprises a processing unit configured to receive incoming operation commands, wherein the processing unit is in communication with the memory of the vehicle operation data recorder.

In some embodiments, vehicle operation data recorded by a vehicle operation data recorder further comprises vehicle status data relating to one or more environmental parameters or operation processes of the vehicle. The vehicle status data relating to one or more environmental parameters may comprise one or more of a location of the vehicle, outside temperature, wind speed, and detection of precipitation. The vehicle status data relating to one or more operation processes may comprise one or more of an acceleration of the vehicle, angular acceleration of the vehicle, speed of the vehicle, position of the vehicle, location of the vehicle, altitude of the vehicle, a position of a vehicle actuator, a flap setting of an aircraft, performance of an engine, running speed of an engine, power output of an engine, a charge percentage of a battery, vehicle cabin pressure, and vehicle cabin temperature. In some embodiments, a remotely controlled vehicle further comprises a camera, and the vehicle status data further comprises one or more pictures taken by the camera of a surrounding environment of the vehicle. The vehicle status data may be associated with a corresponding incoming operation command.

In some embodiments, vehicle operation data recorded by a vehicle operation data recorder further comprises an identification of the remote controller. The identification may comprise a unique serial number of the remote controller. In some embodiments, the vehicle operation data may be associated with a corresponding time.

In some embodiments, the memory of a vehicle operation data recorder may be a non-volatile memory. In some embodiments, the memory is configured to record data continuously. In some embodiments, the memory is configured to record data periodically at pre-determined intervals.

In some embodiments, a vehicle operation data recorder is further configured to enter an accident mode that prevents updates to the recorder when the recorder is alerted that one or more accident conditions are detected. The one or more accident conditions may be selected from a loss of a global positioning system signal of the vehicle, a loss of a radio connection of the vehicle, vehicle collision, vehicle entry into a restricted area, deviation of a flight path of a vehicle from a projected path, abnormal acceleration of the vehicle, abnormal speed of the vehicle, abnormal temperature of the vehicle, and data from a vision sensor of a vehicle indicating poor visibility. The vehicle operation data recorder may be further configured to exit the accident mode when the recorder receives instructions that the accident condition has been resolved.

In some embodiments, a vehicle operation data recorder may be further configured to upload the vehicle operation data to a database in a management center via a secure connection. The uploading of the vehicle operation data may be performed periodically at pre-set intervals, or may be performed when the vehicle operation data recorder is alerted that one or more accident conditions are detected.

In some embodiments, the remotely controlled vehicle is an unmanned aerial vehicle. The incoming operation commands may affect flight of the unmanned aerial vehicle, operation of one or more sensors on-board the unmanned aerial vehicle, and/or positioning of a payload on-board the unmanned aerial vehicle with respect to the rest of the unmanned aerial vehicle.

In another aspect of the present disclosure, a remotely controlled vehicle is described. The remotely controlled vehicle comprises one or more propulsion units configured to affect movement of the remotely controlled vehicle, and a communication module configured to receive incoming operation commands from a remote controller to the remotely controlled vehicle. The remotely controlled vehicle further comprises a device to record vehicle operation data, wherein the device may comprise any vehicle operation data recorder described herein.

In another aspect of the present disclosure, a system for recording operation data comprising user operation data and vehicle operation data for a remotely controlled vehicle is described. The system comprises a vehicle operation data recorder having a memory configured to record vehicle operation data. The vehicle operation data may comprise incoming operation commands that affect operation of the remotely controlled vehicle, said incoming operation commands received via remote controller of the remotely controlled vehicle. The vehicle operation data recorder may comprise any vehicle operation data recorder described herein. The system further comprises a user operation data recorder having a memory configured to recorder user operation data. The user operation data may comprise outgoing operation commands that affect operation of the remotely controlled vehicle, said outgoing operation commands transmitted to the remotely controlled vehicle and received via remote controller of the remotely controlled vehicle. The user operation data recorder may comprise any user operation data recorder described herein.

In another aspect of the present disclosure, a method for analyzing a behavior of a remotely controlled vehicle is described. The method comprises receiving, from a user operation data recorder, user operation data comprising outgoing operation commands that affect operation of the remotely controlled vehicle, said outgoing operation commands received via a remote controller of the remotely controlled vehicle. The method further comprises receiving, from a vehicle operation data recorder, vehicle operation data comprising (1) the incoming operation commands that affect operation of the remotely controlled vehicle or (2) vehicle status data relating to one or more environmental parameters or operation processes of the vehicle. The method further comprises comparing the user operation data and the vehicle operation data, thereby identifying discrepancies which comprise (1) differences between the outgoing operation commands and the incoming operation commands or (2) differences between the incoming operation commands and the vehicle status data. The method further comprises determining, based on the identified discrepancies, one or more causes of the behavior of the remotely controlled vehicle.

In another aspect of the present disclosure, an apparatus for analyzing a behavior of a remotely controlled vehicle is described. The apparatus comprises a communication unit configured to receive (1) user operation data comprising outgoing operation commands that affect operation of the remotely controlled vehicle, said outgoing operation commands received via a remote controller of the remotely controlled, and (2) vehicle operation data comprising (i) the incoming operation commands that affect operation of the remotely controlled vehicle or (ii) vehicle status data relating to one or more environmental parameters or operation processes of the vehicle. The apparatus further comprises one or more processors individually or collectively configured to compare the user operation data and the vehicle operation data, thereby identifying discrepancies which can comprise (1) differences between the outgoing operation commands and the incoming operation commands or (2) differences between the incoming operation commands and the vehicle status data. The one or more processors can be further configured to determine, based on the identified discrepancies, one or more causes of the behavior of the remotely controlled vehicle.

In another aspect of the present disclosure, a system for analyzing a behavior of a remotely controlled vehicle is described. The system comprises a user operation data recorder having a memory configured to record user operation data, wherein the user operation data comprises outgoing operation commands that affect operation of the remotely controlled vehicle, said outgoing operation commands received via a remote controller of the remotely controlled vehicle. The system further comprises a vehicle operation data recorder having a memory configured to record vehicle operation data, wherein the vehicle operation data comprises (1) incoming operation commands that affect operation of the remotely controlled vehicle or (2) vehicle status data relating to one or more environmental parameters or operation processes of the vehicle. The user operation data and the vehicle operation data are accessible for comparison, to identify discrepancies which can comprise (1) differences between the outgoing operation commands and the incoming operation commands or (2) differences between the incoming operation commands and the vehicle status data, thereby determining one or more causes of the behavior of the remotely controlled vehicle.

In some embodiments, an accident occurs with the remotely controlled vehicle and the behavior of the remotely controlled vehicle is analyzed to determine one or more possible causes of the accident. The accident may comprise one or more of a vehicle collision, missing vehicle, vehicle entry into restricted area, and vehicle conducting an illegal activity. Analysis of the behavior of the remotely controlled vehicle may further be used to facilitate an allocation of liabilities for the accident. The allocation of liabilities may be configured to determine insurance pay-outs and/or to determine legal prosecution when illegal activities are identified. Analysis of the behavior of the remotely controlled vehicle may further be used to facilitate a criminal investigation related to the accident.

In some embodiments, the behavior of a remotely controlled vehicle is analyzed to improve design or manufacture of the vehicle or its components.

In some embodiments, the comparison between the user operation data and the vehicle operation data identifies no discrepancies between the outgoing operation commands and the incoming operation commands, and no discrepancies between the incoming operation commands and the vehicle status data. The cause of the behavior of the remotely controlled vehicle may then be determined to be the user sending the operation commands affecting the behavior, wherein the user sent said operation commands unintentionally or intentionally.

In some embodiments, the comparison between the user operation data and the vehicle operation data identifies a discrepancy between the outgoing operation commands and the incoming operation commands. The cause of the behavior of the remotely controlled vehicle may then be determined to be an error in transmission of operation commands to the remotely controlled vehicle. The error may comprise one or more of a malfunction of a communication link between the remote controller and the remotely controlled vehicle, a malfunction of a communication module of the remote controller or the remotely controlled vehicle, and a hijacking incident.

In some embodiments, the comparison between the user operation data and the vehicle operation data identifies a discrepancy between the incoming operation commands and the vehicle status data. The cause of the behavior may then be determined to be an error in execution of the incoming operation commands by the remotely controlled vehicle. The error may comprise a malfunction of an operation process of the remotely controlled vehicle, wherein the vehicle status data may comprise one or more of a data value that falls outside of a normal range for the operation process, a change in a data value that falls outside of a normal range for the operation process, an abnormal combination of data values for the operation processes, and data from a location sensor of the remotely controlled vehicle indicating failure of the location sensor. Alternatively or in combination, the error may comprise a disruption of an operation process of the remotely controlled vehicle by an environmental parameter, wherein the vehicle status data may comprise one or more of data indicating poor visibility, data indicating high winds, and data indicating heavy precipitation.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 7 is a table showing a method for analyzing a behavior of a remotely controlled vehicle, in accordance with embodiments;

DETAILED DESCRIPTION

Figure 1:
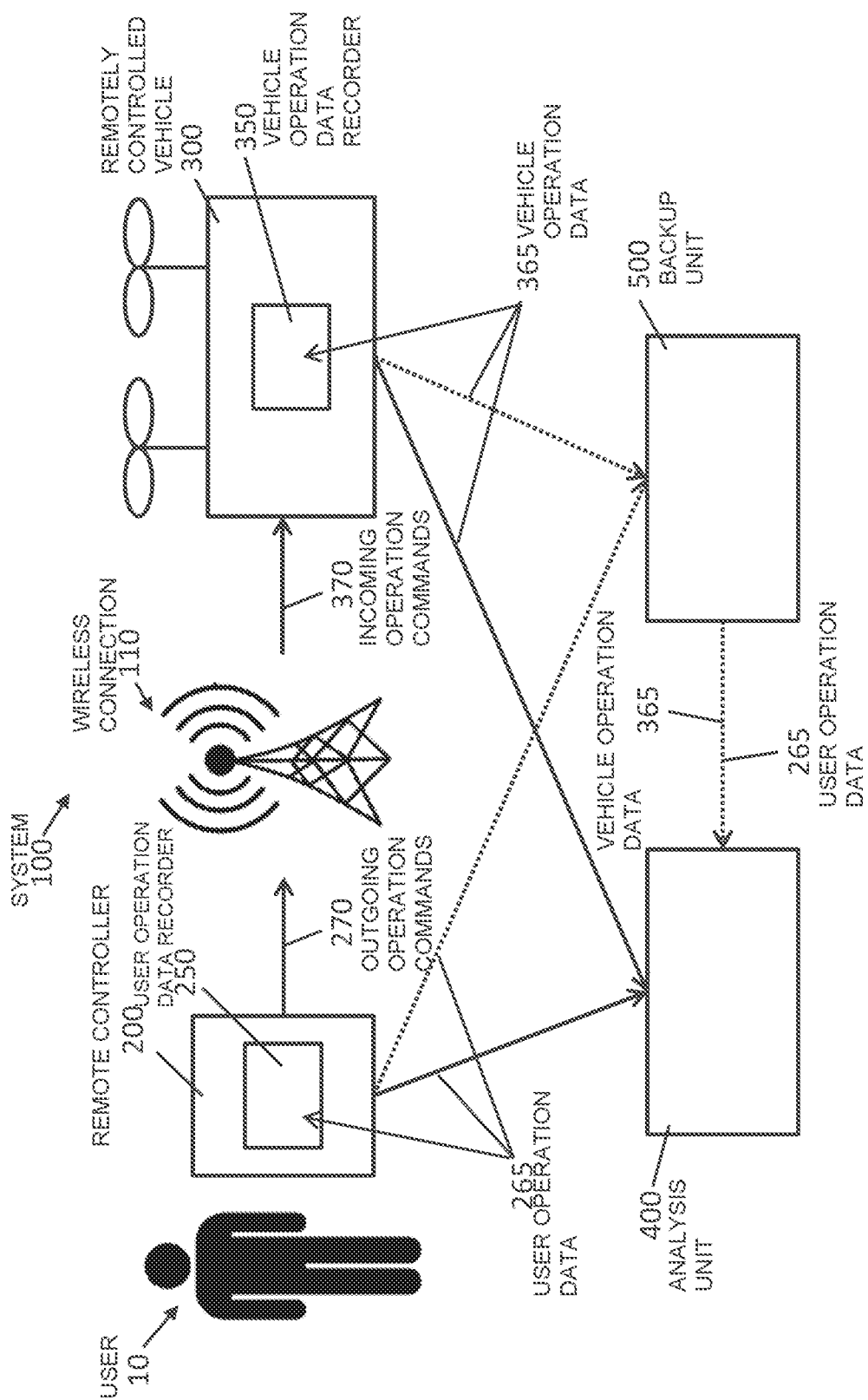
FIG. 1 illustrates a system for recording operation data for a remotely controlled vehicle, in accordance with embodiments.

Systems, methods, and devices provided herein permit recordation of an operation history of a movable object such as a remotely controlled vehicle. The operation history may comprise recorded operation data pertaining to the movable object. The recorded operation data may comprise outgoing operation commands sent from a remote controller of the remotely controlled vehicle, and/or incoming operation commands received by the remotely controlled vehicle. The recorded operation data may further comprise vehicle status data, such as data related to an operation process of the vehicle. The recorded operation history of a vehicle may be used to analyze a behavior of the vehicle. It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Exceptions may occur during the operation of a remotely controlled vehicle, leading to a particular behavior of the vehicle. For example, a malfunction of a vehicle propulsion unit may lead to the vehicle crashing, or a malfunction of a component of the vehicle's navigation system may lead to the vehicle deviating from its projected travel path. In such circumstances, an analysis of the vehicle's operation history may help determine a potential cause for the behavior of the vehicle. As such, a system for maintaining a complete recordation of the operation history of the vehicle may provide a useful tool for analyzing the behavior of the vehicle.

Because of the nature of operation of a remotely controlled vehicle, a complete recordation of a remotely controlled vehicle's operation history includes a recordation of the operation commands as sent to and received by the vehicle. Outgoing operation commands, sent to the remotely controlled vehicle from a remote controller operated by a user, may not always match incoming operation commands, received by the vehicle. For example, an error may occur in signal transmission between the remote controller and the vehicle, resulting in the failure of the vehicle to receive an incoming operation command corresponding to the outgoing operation command. In another exemplary scenario, a hijacking of the remotely controlled vehicle may occur wherein an unauthorized user sends an operation command to the vehicle, resulting in the vehicle receiving an incoming operation command that does not correspond to any recorded outgoing operation commands sent from the remote controller. A system for maintaining a complete record of the outgoing and incoming operation commands affecting the operation of the remotely controlled vehicle may provide a means to more accurately identify the cause for the vehicle's behavior.

The operation data of a remotely controlled vehicle may be recorded by a remote controller or a component thereof. Alternatively or in combination, the operation data may be recorded by the remotely controlled vehicle or a component thereof. In order to protect the integrity of the recorded data, devices for recording the operation data may be have various features or configurations to protect the recorded data.

The remotely controlled vehicle as described herein may comprise an unmanned aerial vehicle (UAV). As described herein, the outgoing and incoming operation commands may comprise commands that affect flight of the UAV, operation of one or more sensors on-board the UAV, and/or positioning of a payload on-board the UAV with respect to the rest of the UAV.

Referring now to the drawings, FIG. 1 illustrates a system 100 for recording the operation data for a remotely controlled vehicle 300, in accordance with embodiments. The system 100 comprises the remotely controlled vehicle 300 and a remote controller 200 of the remotely controlled vehicle, operated by a user or operator 10 of the remotely controlled vehicle. The user can interact with the remote controller to send one or more outgoing operation commands 270 to the remotely controlled vehicle. The remote controller may be a hand held device, and may comprise one or more physical user input components, such as one or more buttons, switches, levers, or joysticks. The remote controller may comprise a software-based user interface, for example provided on a display screen positioned on the remote controller.

The outgoing operation commands 270 may be transmitted through a wireless connection 110, and be received as incoming operation commands 370 by the remotely controlled vehicle 300. The wireless connection may be a direct or an indirect connection, and may, for example, comprise a connection using WiFi, Bluetooth™, or mobile or cellular phone networks (e.g., 3G or 4G networks), as described elsewhere herein. The incoming operation commands received by the remotely controlled vehicle can affect operation of the vehicle.

The outgoing and incoming operation commands may affect flight of an unmanned aerial vehicle (UAV). For example, the operation commands can initiate one or more predetermined flight sequences, such as a flight path or pattern, takeoff sequence, or landing sequence, or send the flight to a preset destination. The operation commands may control the positioning of a payload on-board the vehicle with respect to the rest of the vehicle, for example rotate the payload about one, two, three, or more axes. The operation commands may control the operation of a payload; for example, the payload may be a camera, and the operation commands may instruct the camera to turn on or off, switch modes, zoom, or focus. The operation commands may further control operation of one or more communication units of the vehicle, and/or one or more sensors on-board the vehicle.

The remote controller 200 may comprise a user operation data recorder 250 configured to record user operation data 265. The user operation data may comprise the outgoing operation commands 270. The user operation data recorder may have features or configurations to prevent tampering of the recorded user operation data. The recorded user operation data may be stored in the user operation data recorder, for example on a memory of the user operation data recorder. Alternatively or in combination, the recorded user operation data may be transmitted from the user operation data recorder to one or more other devices, for example for analysis and/or for backup storage, as described in further detail herein.

The remotely controlled vehicle 300 may comprise a vehicle operation data recorder 350 configured to record vehicle operation data 365. The vehicle operation data may comprise the incoming operation commands 370. The vehicle operation data recorder may have features or configurations to prevent tampering of the recorded vehicle operation data. The recorded vehicle operation data may be stored in the vehicle operation data recorder, for example on a memory of the vehicle operation data recorder. Alternatively or in combination, the recorded vehicle operation data may be transmitted from the vehicle operation data recorder to one or more other devices, for example for analysis and/or for backup storage, as described in further detail herein.

The system 100 may further comprise an analysis unit or apparatus 400, configured to receive the user operation data 265 and the vehicle operation data 365, and based on the two sets of data, analyze a behavior of a remotely controlled vehicle. The analysis unit may be supported with a remote controller, with the remotely controlled vehicle, or with a separate device not on-board the remote controller or the vehicle.

Optionally, the system 100 can further comprise a backup unit 500, configured to receive the user operation data 265 and the vehicle operation data 365 over a secure connection and store the data in a database. The backup unit may be supported with a remote controller, with the remotely controlled vehicle, or with a separate device not on-board the remote controller or the vehicle. For example, the backup unit may be supported with a management center, wherein the management center can be configured to communicate with the remote controller and/or the remotely controlled vehicle via a secure channel of communication. Operation data backed up to the backup unit may be retained for pre-determined period of time.

Figure 2:
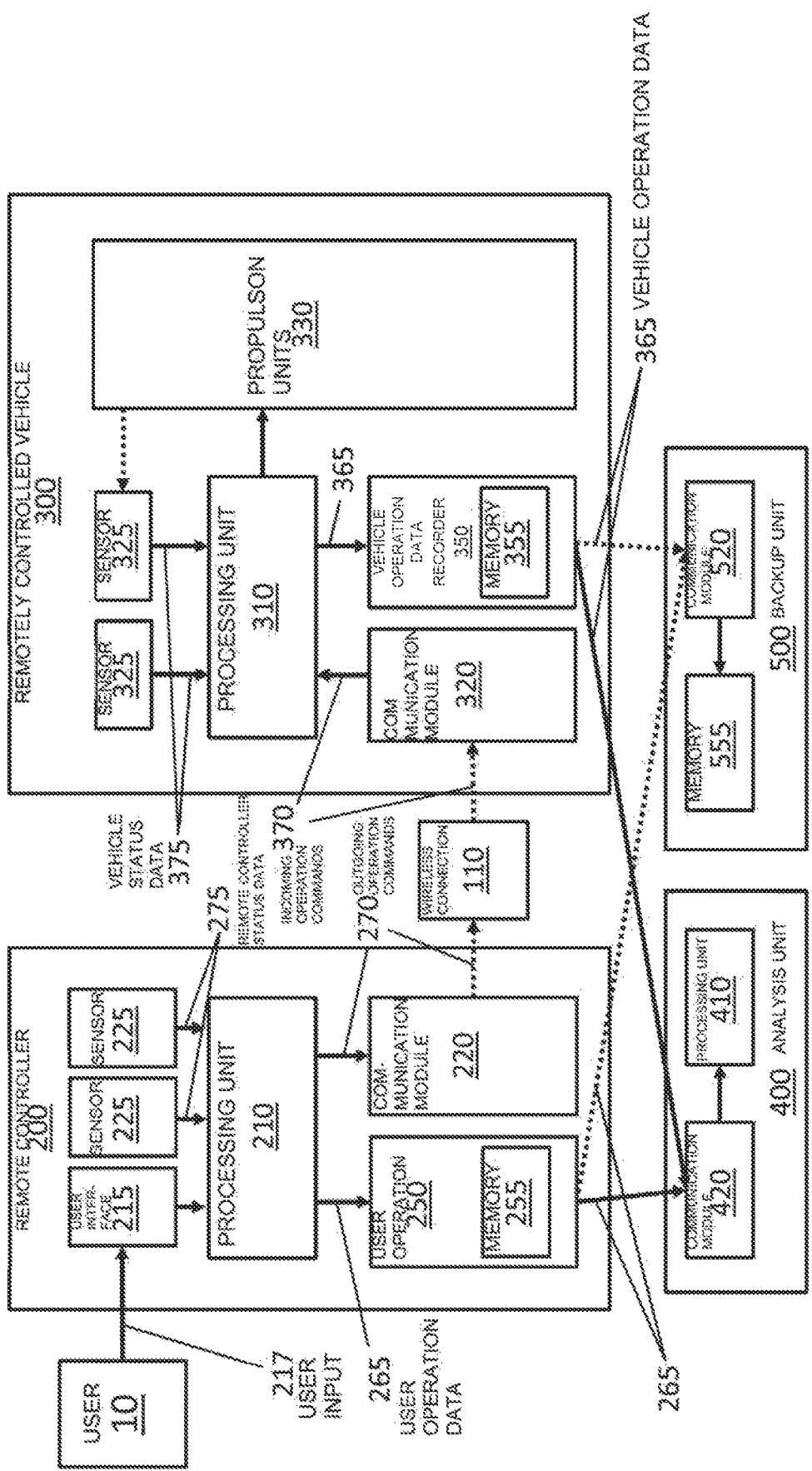
FIG. 2 is a schematic diagram of a system for recording the operation data for a remotely controlled vehicle, in accordance with embodiments.

FIG. 2 is a schematic diagram of the system 100 for recording the operation data for a remotely controlled vehicle 300, in accordance with embodiments. A user 10 can interact with the remote controller 200 via a user interface 215 of the remote controller, providing user input 217. The user input may comprise instructions for controlling operation of the remotely controlled vehicle, which may be translated to outgoing operating commands 270. The user interface 215 may comprise a physical user input component, such as one or more buttons, switches, levers, or joysticks disposed on the remote controller. The user interface may comprise means to utilize one or more sensors configured to detect a user input. For example, the remote controller may comprise one or more inertial sensors configured to sense the tilting of the remote controller, wherein the tilting may be translated to an outgoing operation command. Alternatively or in combination, the user interface may comprise a display screen, providing a software-based interface for the intake of user input. A user may interact with the software-based interface using the one or more physical user input components or sensors of the remote controller, or the display screen may comprise a touchscreen with which a user can interact.

The user input 217 received by the user interface 215 may be provided to a processing unit 210 of the remote controller 200. The processing unit may comprise one or more processors individually or collectively configured to control operation of the remote controller. For example, the processing unit may comprise instructions for providing the user interface, or for receiving the user input and translating the input into one or more outgoing operation commands 270 that affect the operation of the remotely controlled vehicle 300. The outgoing operation commands may, for example, initiate one or more predetermined flight sequences of an unmanned aerial vehicle, control the positioning of a payload on-board the vehicle, control operation of a payload, control operation of one or more communication units of the vehicle, and/or control operation of one or more sensors on-board the vehicle.

The remote controller may further comprise one or more sensors 225 configured to collect remote controller status data 275, relating to one or more environmental parameters or operation processes of the remote controller. For example, the one or more sensors may comprise a global positioning system (GPS) unit, configured to detect the location of the remote controller, which generally corresponds to the location of the user.

The processing unit 210 may be configured receive the remote controller status data 275 from the one or more sensors, and to package the remote controller status data and the outgoing operation commands into user operation data 265. The processing unit may be further configured to send the user operation data to the user operation data recorder 250, where the data may be recorded. The user operation data recorder can comprise a memory 255 configured to record the user operation data. The memory may be a non-volatile memory. The memory may be configured to record data continuously, or to record data periodically at pre-determined intervals. Alternatively or in combination, the memory may be configured to record data in response to events. In many embodiments, the user operation data recorder can have features or configurations to protect the recorded data, as described in further detail herein. For example, the memory may be received in a housing configured to be resistant to destruction, or the memory may be configured to have tamper-proof features (e.g., inaccessible for modification, physically inseparable, system architecture to back-up and/or recover recorded data).

The user operation data recorder may further comprise a processing unit in communication with the memory, wherein the processing unit may be configured to receive the user operation data from the processing unit 210 of the remote controller, and transmit the data to the memory. The processing unit of the user operation data recorder may be further configured to package the user operation data for storage in the memory. For example, where the user operation data comprises two or more subsets of data, the processing unit may be configured to associate one subset of data with one or more other subsets of data, prior to transmitting the thus-packaged user operation data to the memory for storage.

The processing unit 210 of the remote controller may be further configured to send the outgoing operation commands to a communication module 220 of the remote controller 200. The communication module may be configured to package the outgoing operation commands for wireless transmission to the remotely controlled vehicle 300. For example, the communication module may be configured to compress and/or encrypt the outgoing operation commands for wireless transmission.

The communication module 220 of the remote controller 200 may be in communication with a communication module 320 of the remotely controlled vehicle 300, via a wireless connection 110. The communication modules 220 and 320 can include transmitters and/or receivers configured to transmit and/or receive data. For example, the communication modules can include transceivers incorporating one or more transmitters and one or more receivers. The transceiver may have one or more transmitters and one or more receivers integrated into a single component, or distributed over multiple components of the transceiver. The communication modules may communicate using one or more of many methods. For example, the method may comprise a wireless serial communication link such as Bluetooth™. The method may comprise transmitting data over telecommunication networks, cellular networks, or data networks, wherein the networks may comprise Internet or Internet-based networks such as cloud communication networks. The method may comprise direct communication, wherein data is transmitted directly between the remote controller and the remotely controlled vehicle, or the method may comprise indirect communication, wherein data is transmitted via one or more intermediate network nodes such as relay stations, towers, satellites, mobile stations, computers, servers, and the like. Accordingly, the wireless connection 110 may, for example, comprise a connection using WiFi, WiMAX, coded orthogonal frequency-division multiplexing (COFDM), or mobile or cellular phone networks (e.g., 3G or 4G networks).

The communication module 320 of the remotely controlled vehicle 300 can receive incoming operation commands 370. The communication module may be configured to receive and unpackage the incoming operation commands, for example by de-compressing and/or de-encrypting the incoming operation commands. The incoming operation commands may be sent to a processing unit 310 of the remotely controlled vehicle, the processing unit configured to control operation of the remotely controlled vehicle based on the incoming operation commands. For example, the processing unit may transmit instructions to one or more propulsion units 330 for affecting the movement of the remotely controlled vehicle, such as instructions to initiate one or more predetermined flight sequences of an unmanned aerial vehicle. Based on the incoming operation commands, the processing unit may further transmit instructions to control the positioning of a payload on-board the vehicle, control operation of a payload, control operation of one or more communication units of the vehicle, and/or control operation of one or more sensors on-board the vehicle.

The remotely controlled vehicle may further comprise one or more sensors 325, configured to collect vehicle status data 375 relating to one or more environmental parameters or vehicle operation processes, as described in detail elsewhere herein. For example, a sensor may comprise a sensor to detect an acceleration or speed of the vehicle, configured to receive information from one or more propulsion units. Another example of a sensor may be a location sensor such as a global positioning system (GPS) unit, configured to detect the location of the remotely controlled vehicle. Vehicle status data may include vehicle speed and/or acceleration, engine performance, positioning data (e.g., global coordinate, orientation relative to one, two, or three axes of rotation), battery level, and available communication networks, for example.

The processing unit 310 may be configured receive the vehicle status data 375 from one or more sensors, and to package the vehicle status data and the incoming operation commands into vehicle operation data 365. The processing unit may be further configured to send the vehicle operation data to the vehicle operation data recorder 350, where the data may be recorded. The vehicle operation data recorder can comprise a memory 355 configured to record the vehicle operation data, as described in detail elsewhere herein. The memory may be a non-volatile memory. The memory may be configured to record data continuously, or to record data periodically at pre-determined intervals. Alternatively or in combination, the memory may be configured to record data in response to events. The vehicle operation data recorder may further comprise a processing unit in communication with the memory, wherein the processing unit of the vehicle operation data recorder may be configured to receive the vehicle operation data from the processing unit 310 of the remotely controlled vehicle, and send the data to the memory. The processing unit of the vehicle operation data recorder may be further configured to package the vehicle operation data for storage in the memory. For example, where the vehicle operation data comprises two or more subsets of data, the processing unit of the vehicle operation data recorder may be configured to associate one subset of data with one or more other subsets of data, prior to transmitting the thus-packaged vehicle operation data to the memory.

The system 100 may further comprise an analysis unit 400, configured to analyze a behavior of the remotely controlled vehicle 300. The analysis unit can provide an analysis of the possible causes for a behavior of the remotely controlled vehicle. The analysis unit may comprise a communication module 420 configured to receive user operation data 265 and vehicle operation data 365 from the user operation data recorder 250 and vehicle operation data recorder 350, respectively. The communication module 420 can be configured to communicate wirelessly with the user operation data recorder and vehicle operation data recorder, as described in further detail herein. Alternatively or in combination, the communication module 420 may be configured to communicate using a wired communication method. For example, the wired communication method may utilize wires, cables, fiber optics, waveguides, or other suitable physical connections to transmit data. The analysis unit may be supported with a remote controller, with the remotely controlled vehicle, or with a separate device not on-board the remote controller or the remotely controlled vehicle.

The analysis unit 400 may further comprise a processing unit 410, configured to receive the user operation data and vehicle operation data from the communication module 420. The processing unit 410 may comprise one or more processors, individually or collectively configured to compare the user operation data and vehicle operation data, thereby identifying discrepancies between the two data sets. The discrepancies may include, for example, differences between the outgoing operation commands and incoming operation commands, differences between the incoming operation commands and the vehicle status data, and/or differences between the outgoing operation commands and the vehicle status data. Based on the identified discrepancies, the processing unit 410 may determine one or more causes of a behavior of the remotely controlled vehicle, as described in further detail herein.

The analysis unit 400 may be configured to perform an analysis periodically at pre-set intervals, for example every 5 seconds, or in response to one or more events, for example after the completion of each trip of the remotely controlled vehicle. Alternatively or in combination, the analysis unit may be configured to perform an analysis when prompted by a user having special privileges or authorization to access the recorded operation history. Alternatively or in combination, the analysis may be performed when vehicle operation has encountered one or more exceptional conditions. An exceptional condition may comprise, for example, one or more of a loss of communication with the vehicle, a missing remotely controlled vehicle, a remotely controlled vehicle collision, remotely controlled vehicle entry into a restricted area, deviation of the traveled path of a remotely controlled vehicle from the projected path, abnormal acceleration of the remotely controlled vehicle, abnormal speed of the remotely controlled vehicle, abnormal temperature of the remotely controlled vehicle, or data from a vision sensor of a remotely controlled vehicle indicating poor visibility.

The system 100 may optionally comprise a backup unit 500, configured to store the user operation data and the vehicle operation data in a database. The backup unit may be supported with the remote controller 200, with the remotely controlled vehicle 300, or with a separate device not on-board the remote controller or the remotely controlled vehicle. The backup unit may be combined with the analysis unit 400, or the analysis unit and the backup unit may be separate devices. A backup unit may be configured to receive data from a plurality of remote controllers and/or a plurality of remotely controlled vehicles. In many embodiments, the backup unit may be supported with a management center, wherein the management center can be configured to communicate with one or more remote controllers and/or the remotely controlled vehicles via a secure channel of communication. The management center can thus function as a repository of operation data. Operation data backed up to the backup unit may be retained for pre-determined period of time.

The backup unit may comprise a communication module 520 configured to receive data from the user operation data recorder and the vehicle operation data recorder. The communication module can be configured to communicate with the user operation data recorder and vehicle operation data recorder using a wireless communication method, a wired communication method, or a combination thereof, as described in further detail herein. The communication method may, for example, comprise a connection over a network having an unlimited range, or a network having a limited range. In some embodiments, the connection is a secure connection, to ensure the integrity of the data being transmitted. The user operation data recorder and vehicle operation data recorder may be configured to upload data to the backup unit periodically at pre-set intervals. Alternatively or in combination, data may be uploaded to the backup unit when vehicle operation has encountered one or more exceptional conditions, as described in further detail herein.

The communication module 520 may be configured to provide the received data to a memory 555, the memory 555 comprising a database for storing the operation data. The database may be configured to store the operation data of a plurality of remote controllers and/or a plurality of remotely controlled vehicles. For example, the memory 555 may comprise a plurality of memory units, each configured to store the operation data of each of the plurality of remote controllers or remotely controlled vehicles. Alternatively or in combination, the database may comprise a plurality of component databases, each configured to store the operation data of each of the plurality of remote controllers or remotely controlled vehicles. The database can provide back-up storage for the operation data, to prevent loss of the data in case one or more of the user operation data recorder and vehicle operation data recorder are compromised.

In many embodiments, the recorded user operation data and/or the vehicle operation data are accessible for retrieval only by users having special privileges or authorization. Users having special privileges or authorization may include a governmental agency or an operator authorized by the government. For example, the authorized users may be a government-appointed law enforcement entity, retrieving the recorded operation history data for the purpose of conducting an investigation related to an incident of the remotely controlled vehicle entering a restricted area without authorization. Optionally, the user operation data recorder and/or vehicle operation data recorder may be configured to have one or more settings that can be modified by users having special privileges or authorization. For example, the user operation data recorder or vehicle operation data recorder may be configured to enter one or more special operation modes based on the occurrence of one or more particular operation conditions of the remotely controlled vehicle, or based on a particular behavior of the remotely controlled vehicle. In such cases, the users having special privileges or authorization may have the ability to issue instructions to the user operation data recorder and/or the vehicle operation data recorder to change the operation mode.

In some embodiments, the user operation data recorder and/or vehicle operation data recorder may be configured to enter an "accident mode" when the recorders are alerted of the occurrence of one or more exceptional conditions in the operation of the remotely controlled vehicle 300 as described herein (e.g., vehicle collision, deviation of the traveled path of a vehicle from the projected path, etc.). The one or more exceptional conditions may be detected by one or more of the remote controller, the remotely controlled vehicle, and the analysis unit. Accordingly, one or more of the remote controller, the remotely controlled vehicle, and the analysis unit may generate an alert that is sent to the user operation data recorder and/or the vehicle operation data recorder. In the accident mode, the user operation data recorder or the vehicle operation data recorder may be configured to "lock down", or initiate a mechanism for preventing updates from being made to the user operation data or vehicle operation data. The user operation data recorder or the vehicle operation data recorder may be configured to exit the accident mode when the recorders receive clearance that the exceptional condition has been resolved. Such a clearance may be issued, for example, by a user having special privileges or authorization, as described herein.

In many embodiments, the data recorded to the user operation data recorder and the vehicle operation data recorder is configured to be inaccessible for modification, in order to protect the integrity of the recorded data. The user operation data and the vehicle operation data may be accessible for purposes other than modification to the recorded data, for example for the retrieval of the recorded data. The user operation data recorder may be physically integrated with the processing unit of the remote controller, such that the remote controller becomes inoperable if the user operation data recorder is tampered with. Similarly, the vehicle operation data recorder may be physically integrated with the processing unit of the remotely controlled vehicle, such that the vehicle becomes inoperable if the vehicle operation data recorder is tampered with. Consequently, the tampering of either the user operation data recorder or the vehicle operation data recorder may result in the inability of the remotely controlled vehicle to be operated; for example, for a UAV, the UAV may no longer be able to fly. A system in package (SIP) technology may be used to integrate the user operation data recorder or the vehicle operation data recorder with the respective processing unit in one package. For example, multiple functional chips of a processing unit may be packaged together with the memory of the data recorder, such that the package performs a complete function. An attempt to separate the memory from its package can destroy the functioning of the other modules in the package, resulting in a disabled remote controller or remotely controlled vehicle. In another exemplary embodiment, chip-on-board (COB) technology may be used to integrate the user operation data recorder or vehicle operation data recorder with its respective processing unit, wherein each of the memories is adhered to an interconnection substrate and wire-bonded to achieve electrical connection. An attempt to remove the memory from the interconnection substrate can compromise the physical integrity of the memory, thus preventing a user from accessing the data recorded in the memory. Conversely, an attempt to remove the memory from the interconnection substrate may not harm the integrity of the data stored in the memory, but destroy the functioning of other modules adhered to the same interconnection substrate, rendering the remote controller or the remotely controlled vehicle inoperable. Such a configuration may allow a user to retrieve the recorded data for analysis, though in some embodiments the data is not accessible for modification.

Alternatively or in combination with physical integration methods, the user operation data recorder or the vehicle operation data recorder may be integrated via software with the processing unit of the remote controller or the remotely controlled vehicle. For example, a processing unit may be implemented with a software version that corresponds to a unique identity of the user operation data recorder or the vehicle data operation recorder, respectively, such that regular operation of the software of the processing unit requires obtaining the unique identity of the user operation data recorder or the vehicle operation data recorder. The unique identity of either data recorder may be configured to be destroyed with a detected attempt to tamper with the data recorder, such that the software of the processing unit for the remote controller or the remotely controlled vehicle becomes inoperable thereafter.

The user operation data recorder or the vehicle operation data recorder may further comprise a housing, configured to receive the memory of each recorder. The housing may be removable from the remote controller or from the remotely controlled vehicle, for the retrieval of the user operation data or the vehicle operation data. In many embodiments, the housing is configured to be more resistant to destruction than the rest of the remote controller or the remotely controlled vehicle. For example, the housing may comprise one or more of a shock-absorbing material, waterproof material, heatproof material, electrically insulated material, and corrosion resistant material. The housing may, for example, be configured to withstand an acceleration of up to 3,400 g, or an impact velocity of about 310 mph. The housing may be further configured to withstand temperatures over 1,000° C.

The housing may further comprise a tamper-evident structure, in order to discourage tampering attempts and detect any such attempts. For example, the tamper-evident structure may comprise one or more labels, such as a paper label, adhered to one or more fasteners of the housing, such that an attempt to unfasten one or more of the fasteners can result in evident physical damage to the label. The tamper-evident structure may also comprise one or more fasteners of the housing that are coupled to an electrical circuit, such that an attempt to unfasten the one or more fastener can result in a detected change to the electrical circuit that is recorded to the memory or the processing unit of the remote controller or the remotely controlled vehicle.

The memory may be further configured to resist damage to the operation data stored therein. A memory may utilize a redundant array of independent disks (RAID) technology, wherein the memory may comprise an array of multiple disk drives operating as a single logical unit. RAID technology with mirroring, striping, and/or parity may be utilized, as is known in the art. For example, the memory may be configured to record the user operation data or the vehicle operation data to two or more of the multiple disk drives of the array, such that in the event of failure of a disk drive, the data can be recovered from one or more of the remaining disk drives. Alternatively or in combination, the memory may be configured to record the user operation data or vehicle operation data as logically sequential segments, each segment recorded to at least one of the multiple disk drives of the array; in the event of failure of a disk drive, the segment recorded to the failed disk may be reconstructed using one or more segments recorded to one or more of the remaining disk drives of the array.

Figure 3:
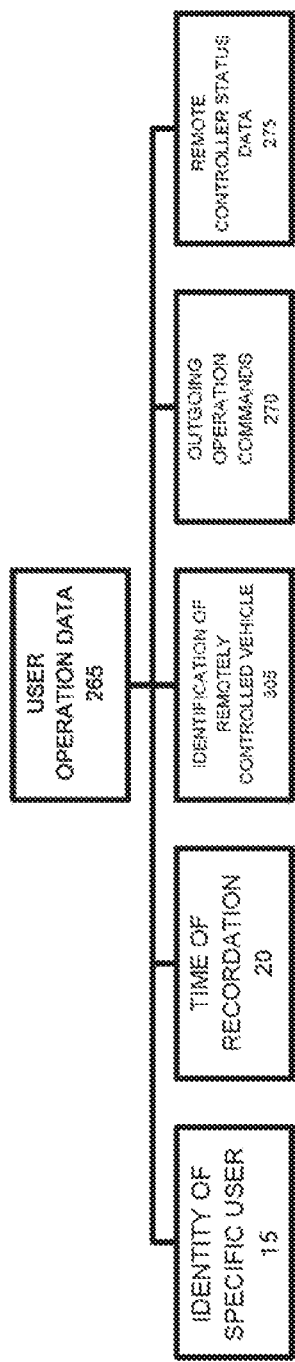
FIG. 3 is a schematic diagram of user operation data recorded by a user operation data recorder, in accordance with embodiments.

FIG. 3 is a schematic diagram of user operation data 265 recorded by a user operation data recorder, in accordance with embodiments. The user operation data may comprise the outgoing operation commands 270 that affect operation of a remotely controlled vehicle, wherein the outgoing operation commands are received from a user of the vehicle via a remote controller. The user operation data may further comprise other data related to the user or remote controller. For example, the user operation data may further comprise the remote controller status data 275, which may comprise the location of the remote controller, the location of the remote controller often indicating the location of the user operating the remote controller. The remote controller may comprise one or more sensors configured to detect the remote controller location, such as a global positioning system (GPS) unit.

The user operation data may further comprise the time 20 of recordation of each subset of data within the user operation data. The time may include one or more of the date, day of the week, time of day, or any other indication of time. Each subset of data, such as a set of outgoing operation commands or the location of the remote controller, may be associated with the corresponding time. The "time-stamped" user operation data can provide a more complete picture of the operation history of the remotely controlled vehicle, and thereby facilitate the analysis of the operation data.

The user operation data may further comprise an identification 305 of the remotely controlled vehicle. The system for recording the operation history of the remotely controlled vehicle can be configured to associate the user operation data with a unique identification of a remotely controlled vehicle, wherein the unique identification may differentiate and/or distinguish the remotely controlled vehicle from other remotely controlled vehicles, such as all other remotely controlled vehicles. The remotely controlled vehicle identification may, for example, comprise a unique serial number of the remotely controlled vehicle.

The user operation data may further comprise an identity 15 of a specific user of the remotely controlled vehicle. A remotely controlled vehicle may be operated by a plurality of users. The system for recording the operation history of the remotely controlled vehicle can be configured to associate the user operation data, comprising the outgoing operation commands, with a recognized identity of a user. Recognition of the user identity may comprise providing user authentication for each of the one or more users of the remotely controlled vehicle. For example, the user interface of the remote controller may provide a means for each user to log in to an air control system using a unique user identity and an authentication key, such as a password. The user operation data recorder may be configured to begin recording user operation data once a user is authenticated and logged in, associating the recorded data, comprising the outgoing operation commands entered into the remote controller by a specific user, with the identity of the user. The user operation data recorder may be further configured to end recording user operation data when the user authentication is terminated. The user operation data recorder may be configured to distinguish data for each user from data for other users via physical separation of the storage regions for each user's data. For example, the memory of the user operation data recorder may comprise physically separate memory components, each of which stores the user operation data for one user. Alternatively or in combination, the user operation data recorder may be configured to distinguish data for each user from data for other users via digital means. For example, the memory may comprise digitally separated databases, each database storing the user operation data for one user. The association of user operation data with a user identity can provide a way to capture the contribution of each user to the recorded user operation data.

Figure 4:
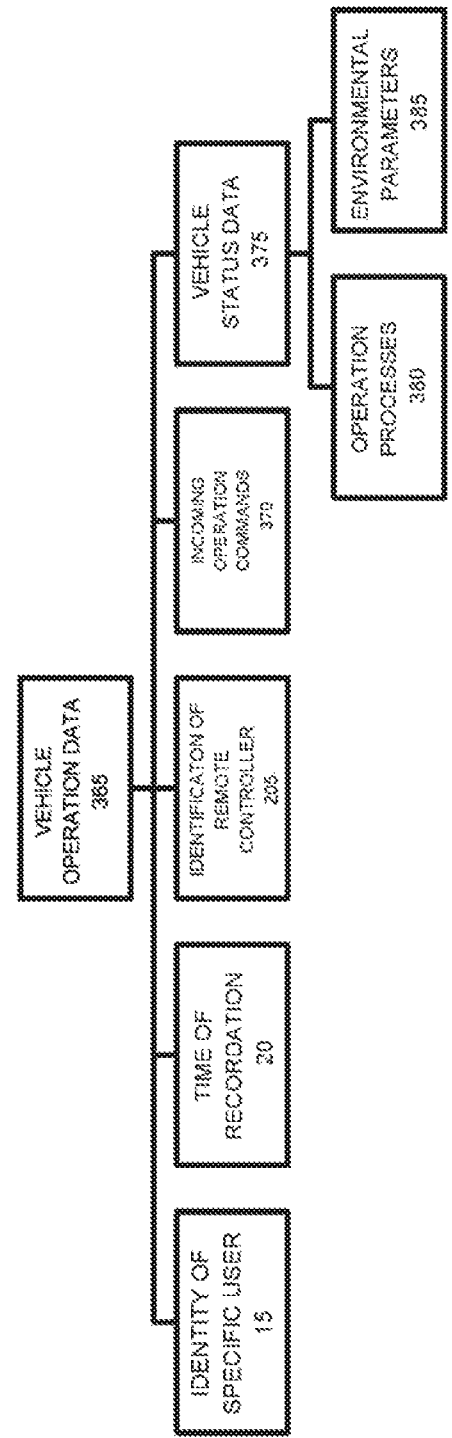
FIG. 4 is a schematic diagram of vehicle operation data recorded by a vehicle operation data recorder, in accordance with embodiments.

FIG. 4 is a schematic diagram of vehicle operation data 365 recorded by a vehicle operation data recorder, in accordance with embodiments. The vehicle operation data may comprise incoming operation commands 370 that affect operation of a remotely controlled vehicle, wherein the incoming operation commands are received from a remote controller operated by a user of the remotely controlled vehicle.

The remotely controlled vehicle operation data may further comprise vehicle status data 375, relating to one or more environmental parameters 385 or operation processes 380 of the remotely controlled remotely controlled vehicle. The remotely controlled remotely controlled vehicle may comprise one or more sensors configured to collect the remotely controlled vehicle operation data. For example, one or more sensors may be coupled to one or more propulsion units of the remotely controlled remotely controlled vehicle to collect data relating to an operation process of the remotely controlled vehicle. The vehicle status data relating to one or more operation processes may include an acceleration of the remotely controlled vehicle, angular acceleration of the remotely controlled vehicle, speed of the remotely controlled vehicle, position of the remotely controlled vehicle, orientation of the remotely controlled vehicle relative to one, two, or three axes of rotation, location or global coordinate of the remotely controlled vehicle, altitude of the remotely controlled vehicle, a position of a remotely controlled vehicle actuator, a flap setting of an aircraft, performance of an engine, running speed of an engine, power output of an engine, a charge percentage of a battery, availability of communication networks, remotely controlled vehicle cabin pressure, and remotely controlled vehicle cabin temperature. Further, one or more sensors may be coupled to an exterior portion of the remotely controlled remotely controlled vehicle, so as to collect data relating to an environmental parameter of the surrounding environment. Vehicle status data relating to one or more environmental parameters may include a location of the remotely controlled vehicle, outside temperature, wind speed, or detection of precipitation. In embodiments of the remotely controlled remotely controlled vehicle comprising a camera, the vehicle status data relating to an environmental parameter may comprise one or more pictures taken by the camera of the surrounding environment of the remotely controlled vehicle. The vehicle status data may be associated with a corresponding incoming operation command, wherein the vehicle status data results from the execution of the corresponding incoming operation command by the remotely controlled remotely controlled vehicle.

The vehicle operation data may further comprise the time 20 of recordation of each subset of data within the vehicle operation data. The time may include one or more of the date, day of the week, time of day, or any other indication of time. Each subset of data, such as a set of incoming operation commands or the vehicle status data, may be associated with the corresponding time. The "time-stamped" vehicle operation data can provide a more complete picture of the operation history of the remotely controlled vehicle, and thereby facilitate the analysis of the operation data.

The vehicle operation data may further comprise an identification 205 of the remote controller. A remotely controlled vehicle may be controlled by a plurality of remote controllers. The system for recording the operation history of the remotely controlled vehicle can be configured to associate the vehicle operation data with a unique identification of a remote controller. The remote controller identification may, for example, comprise a unique serial number of the remotely controlled vehicle.

The vehicle operation data may further comprise an identity 15 of a specific user of the remotely controlled vehicle. The system for recording the operation history of the vehicle can be configured to associate the vehicle operation data, comprising the incoming operation commands and/or the vehicle status data, with a specific user of the vehicle. In some embodiments, the incoming operation commands may be received from the remote controller pre-associated with the identity of a specific user. Alternatively, the vehicle operation data recorder may be configured to recognize an identity of a specific user, and using the identity of the user, associate the vehicle operation data with the specific user. Recognition of the user identity may comprise providing user authentication for each of the one or more users of the remotely controlled vehicle. For example, the user interface of the remote controller may provide a means for each user to log in to an air control system using a unique user identity and an authentication key, such as a password. The vehicle operation data recorder may be configured to begin recording user operation data once a user is authenticated and logged in, associating the recorded data with the identity of the user. The vehicle operation data recorder may be further configured to end recording vehicle operation data when the user authentication is terminated. The vehicle operation data recorder may be configured to distinguish data for each user from data for other users via physical separation of the storage regions for each user's data. For example, the memory of the vehicle operation data recorder may comprise physically separate memory components, each of which stores the vehicle operation data for one user. Alternatively or in combination, the vehicle operation data recorder may be configured to distinguish data for each user from data for other users via digital means. For example, the memory may comprise digitally separated databases, each database storing the vehicle operation data for one user.

Figure 5:
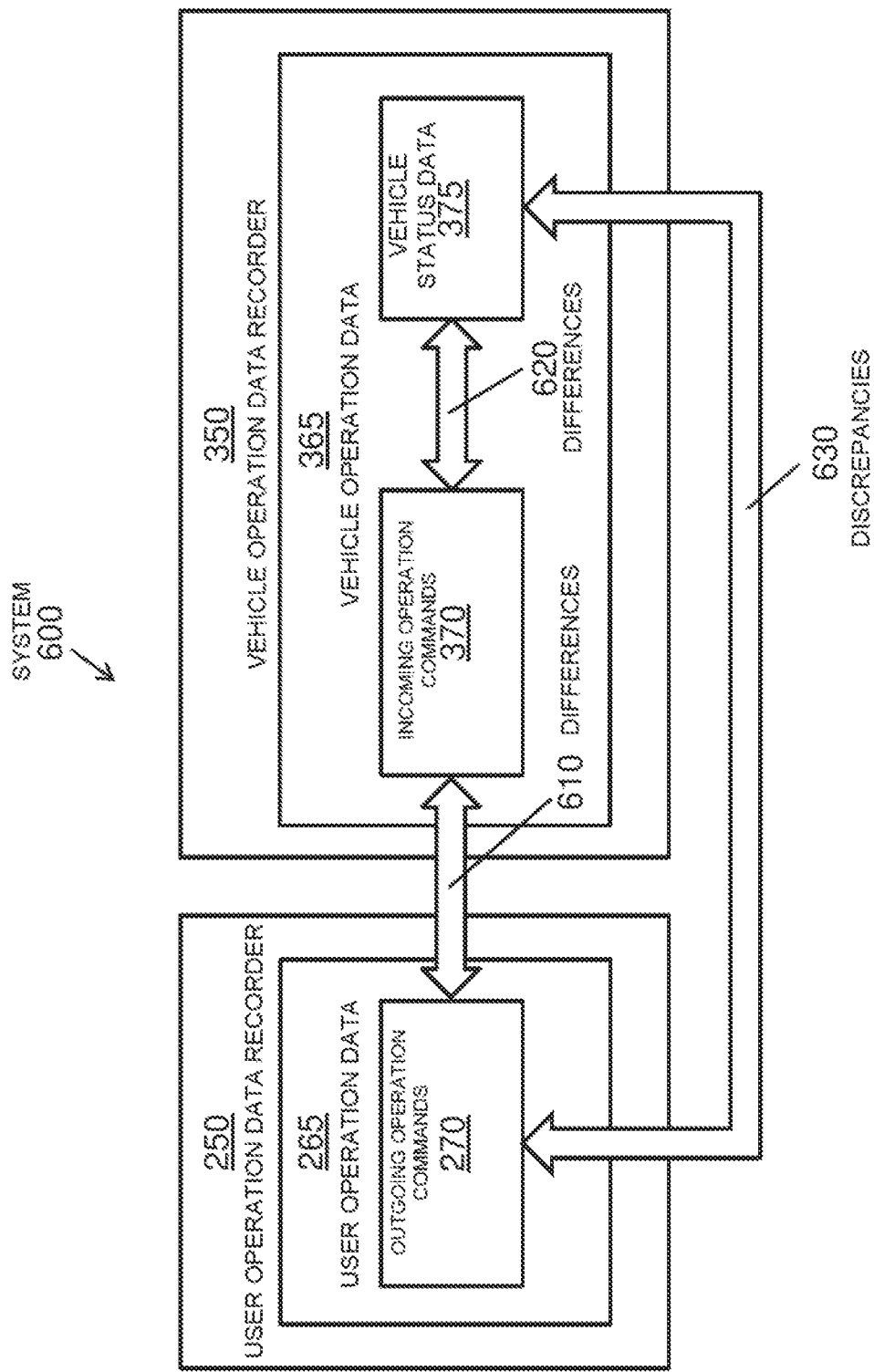
FIG. 5 illustrates, by way of a block diagram, a method for analyzing a behavior of a remotely controlled vehicle, in accordance with embodiments.

FIG. 5 illustrates, by way of a block diagram, a system 600 for analyzing a behavior of a remotely controlled vehicle, in accordance with embodiments. The system may comprise a user operation data recorder 250 and a vehicle operation data recorder 350, as described in further detail herein. The user operation data recorder may be configured to record user operation data 265, comprising outgoing operation commands 270 that affect operation of the remotely controlled vehicle, the outgoing operation commands received via a remote controller from a user of the remotely controlled vehicle. The user operation data may further comprise remote controller status data, such as the location of the remote controller. The vehicle operation data recorder is configured to record vehicle operation data 365 comprising incoming operation commands 370 that affect operation of the remotely controlled vehicle, the incoming operation commands received from the remote controller by the remotely controlled vehicle. The vehicle operation data may further comprise vehicle status data 375, which may comprise data relating to an environmental parameter or operation process of the vehicle, as described herein. The system may further comprise an analysis unit as described herein, for performing an analysis of the operation data.

The user operation data and vehicle operation data are accessible for comparison, in order to identify discrepancies which may comprise (1) differences 610 between the outgoing operation commands and incoming operation commands and/or (2) differences 620 between the incoming operation commands and the vehicle status data. Optionally, a comparison may also be performed to identify discrepancies 630 between the outgoing operation commands and the vehicle status data. The identified discrepancies may help to determine one or more causes of the behavior of the remotely controlled vehicle. Differences between the outgoing and incoming operation commands can help identify errors in the transmission of operation commands from the remote controller to the remotely controlled vehicle. Differences between the incoming operation commands and the vehicle status data can help identify errors in the execution of received operation commands by the remotely controlled vehicle. Differences between the outgoing operation commands and the vehicle status data can help identify errors in the execution of the operation commands as transmitted by the remote controller.

Figure 6:
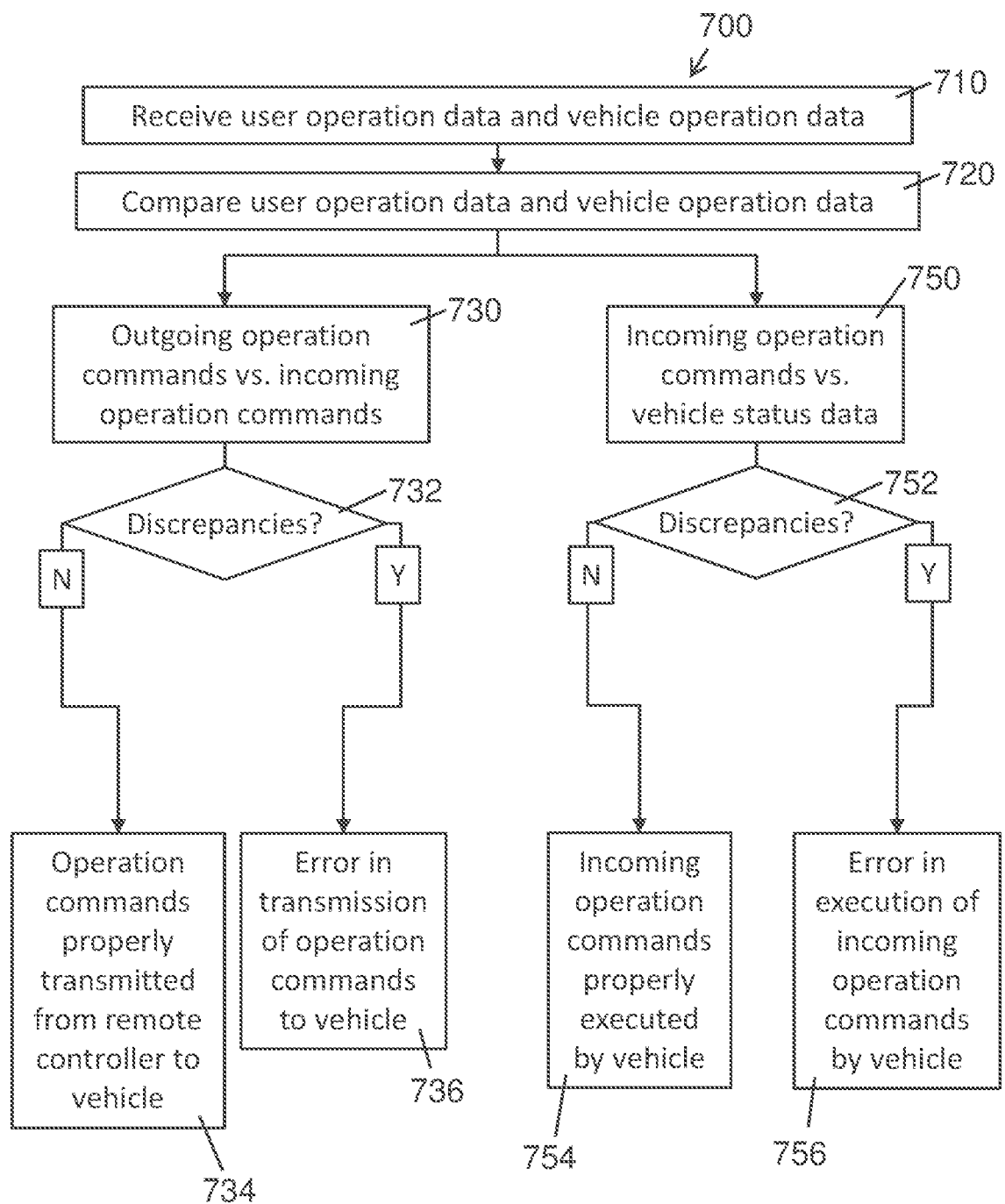
FIG. 6 is a flowchart illustrating a method for analyzing a behavior of a remotely controlled vehicle, in accordance with embodiments.

FIG. 6 is a flowchart illustrating a method 700 for analyzing a behavior of a remotely controlled vehicle, in accordance with embodiments. The method may be performed using an analysis unit as described herein. At step 710, the analysis unit receives the user operation data from the user operation data recorder, and the vehicle operation data from the vehicle operation data recorder. As described in further detail herein, the user operation data may comprise outgoing operation commands affecting operation of the remotely controlled vehicle, transmitted from a remote controller to the remotely controlled vehicle; the vehicle operation data may comprise incoming operation commands received by the remotely controlled vehicle from the remote controller, as well as vehicle status data relating to one or more environmental parameters or operation processes of the vehicle.

At step 720, the user operation data and vehicle operation data are compared to identify any discrepancies. Any subset of data within the two data sets may be compared with one or more of the other subsets of data within the two data sets. For example, the outgoing operation commands from the user operation data may be compared with the vehicle status data from the vehicle operation data. Such a comparison may indicate whether any errors were present in the vehicle's execution of the operation commands as transmitted by the remote controller, though the comparison may not provide detailed information regarding the nature of the identified errors or their cause. To gain further insight, additional comparisons between different subsets of data may be performed.

At step 730, the outgoing operation commands from the user operation data may be compared with the incoming operation commands from the vehicle operation data. The comparison may comprise, as in step 732, an identification of discrepancies between the two sets of data. If no discrepancies are found, in step 734, it may be determined that the operation commands were properly transmitted from remote controller to remotely controlled vehicle. If a discrepancy is identified, in step 736, it may be determined that at least a part of the cause of the vehicle behavior is an error in the transmission of the operation commands to the remotely controlled vehicle. Additional analyses may be performed to identify the type of error. For example, the analysis may find that the discrepancies comprise one or more portions of the outgoing operation commands missing from the incoming operation commands. Such discrepancies may indicate that the vehicle behavior may be attributed to a failure in the transmission of the outgoing operation commands from the remote controller to the vehicle. Alternatively or in combination, the discrepancies may indicate that the vehicle behavior may be attributed to a hijacking incident, wherein a hijacker has intercepted a portion of the outgoing operation commands. Further analyses may also find that the discrepancies comprise one or more portions of the outgoing operation commands being different from the corresponding portions of the incoming operation commands. Such discrepancies may indicate that the vehicle behavior is caused by an error in the transmission of the outgoing operation commands from the remote controller to the remotely controlled vehicle. Alternatively or in combination, the discrepancies may indicate the vehicle behavior was caused by a hijacking incident, wherein a hijacker has intercepted and modified a portion of the outgoing operation commands. Further analyses may also find that the discrepancies comprise one or more portions of the incoming operation commands missing from the outgoing operation commands. Such a discrepancy may indicate that the cause of the vehicle behavior may be a hijacking incident, wherein a hijacker has sent the operation commands received by the vehicle as incoming operation commands.

The comparison 720 may further comprise step 750, wherein the incoming operation commands and the vehicle status data, both data subsets from the vehicle operation data, are compared. The comparison may comprise, as in step 752, an identification of discrepancies between the two sets of data. If no discrepancies are found, in step 754, it may be determined that the incoming operation commands were executed properly by the remotely controlled vehicle. If a discrepancy is identified, in step 756, it may be determined that the at least a part of the cause of the vehicle behavior is an error in the execution of the incoming operation commands by the remotely controlled vehicle. Further analysis of the discrepancies may provide additional insight regarding the nature of the identified errors. For example, a subset of the vehicle status data, generated from one sensor of the remotely controlled vehicle, may be compared with one or more other subsets of the vehicle status data, generated from other sensors of the remotely controlled vehicle.

One or more comparisons may be performed between subsets of the user operation data and the vehicle operation data, in order to gain a more detailed understanding of the possible cause of the behavior of the remotely controlled vehicle. For example, both steps 730 and 750 may be performed, in order to determine whether the cause of the vehicle's behavior comprises one or more of identifiable causes in steps 734, 736, 754, and 756.

FIG. 7 is a table showing a method 700 for analyzing a behavior of a remotely controlled vehicle, in accordance with embodiments. The table summarizes some of the possible causes of the behavior of the remotely controlled vehicle, as determined by method 700. The possible causes summarized in FIG. 7 are provided by way of example only, and many other causes may also be possible either alternatively or in combination with one or more of the causes summarized in FIG. 7.

In some instances, the analysis performed using method 700 may identify no discrepancies between the outgoing operation commands and the incoming operation commands, and no discrepancies between the incoming operation commands and the vehicle status data. In such instances, it may be determined the operation commands sent by the user were properly executed by the remotely controlled vehicle, and hence that the remotely controlled vehicle's behavior was caused by the user's commands. For example, a user may have entered an input translated into outgoing operation commands comprising instructions for a UAV to enter a restricted area, causing the UAV to enter the restricted area. As such, in these instances, the user may be held liable for the consequences of the remotely controlled vehicle's behavior. In some instances, the user may have sent the operation commands unintentionally (e.g., accidentally touched wrong component of the remote controller's user interface). In some instances, the user may have sent the commands intentionally.

In some instances, the analysis performed using method 700 may identify a discrepancy between the outgoing operation commands and the incoming operation commands. Further analysis of the discrepancies may be performed, in order to gain further insight regarding the nature of errors, as described elsewhere herein. Depending on the results of the additional analysis, it may be determined that the remotely controlled vehicle's behavior was caused by a malfunction of a communication link (e.g., wireless connection) between the remote controller and the remotely controlled vehicle, a malfunction of a communication module of the remote controller and/or the remotely controlled vehicle, or a hijacking incident. A malfunction of a communication link may comprise, for example, the loss of connectivity provided by a wireless network. Such a malfunction may lead to the failure of an outgoing operation command to reach the communication module of the remotely controlled vehicle. A malfunction of a communication module may comprise, for example, a mechanical or electrical failure of a communication module of the remote controller and/or the remotely controlled vehicle. Such a malfunction may lead to a failure of a remote controller to transmit the outgoing operation commands, or a failure of remotely controlled vehicle to receive the incoming operation commands. A hijacking incident may comprise a hijacker intercepting an outgoing operation commands, modifying an outgoing operation command, and/or sending an unauthorized operation command. For example, a hijacker may intercept and/or modify an outgoing operation command comprising instructions for a landing sequence for a UAV, causing the UAV to crash or modify its flight path. In another exemplary scenario, a hijacker may send an unauthorized operation command comprising instructions for a camera on-board a UAV to perform an illegal surveillance activity. If the analysis identifies no concurrent discrepancies between the incoming operation commands and the vehicle status data, it may be determined that the behavior under analysis was not caused by any errors in the execution of incoming operation commands by the remotely controlled vehicle.

In some instances, the analysis performed using method 700 may identify a discrepancy between the incoming operation commands and the vehicle status data. In such instances, it may be determined that the cause of the remotely controlled vehicle's behavior is an error in the execution of incoming operation commands by the remotely controlled vehicle. The error may comprise a malfunction of an operation process of the remotely controlled vehicle, such as an engine function of the remotely controlled vehicle. Such a malfunction may be identified via further analysis of the vehicle status data. For example, the vehicle status data may comprise a data value that falls outside of a normal range for an operation process, a change in a data value that falls outside of a normal range for the operation process, or an abnormal combination of data values for the operation process. The vehicle status data may comprise data from a location sensor of the remotely controlled vehicle indicating failure of the location sensor. Alternatively or in combination, the error in the execution of incoming operation commands by the remotely controlled vehicle may comprise a disruption of a function of the remotely controlled vehicle by an environment parameter. For example, the vehicle status data may comprise data from a vision sensor of the remotely controlled vehicle indicating poor visibility, or data from a precipitation sensor indicating heavy precipitation. If the analysis identifies no concurrent discrepancies between the outgoing and incoming operation commands, it may be determined that the behavior under analysis was not caused by any errors in transmission of operation commands to the remotely controlled vehicle.

In some instances, the analysis performed using method 700 may identify discrepancies both between outgoing and incoming operation commands, and between incoming operation commands and vehicle status data. In such instances, it may be determined that the cause of the remotely controlled vehicle's behavior is a combination of one or more of an error in the transmission of operation commands to the remotely controlled vehicle and an error in the execution of incoming operation commands by the remotely controlled vehicle.

The method for analyzing a behavior of a remotely controlled vehicle may have many applications. For example, an accident may occur with the remotely controlled vehicle, wherein the accident may comprise one or more of a remotely controlled vehicle collision, missing remotely controlled vehicle, remotely controlled vehicle entry into a restricted area, and remotely controlled vehicle conducting an illegal activity. The analysis may then be used to determine one or more possible causes of the accident, as described in detail herein.

The information pertaining to the analysis may be used to facilitate an allocation of liabilities for the accident. For example, if a remotely controlled vehicle has collided with another remotely controlled vehicle, determining the cause of the collision may facilitate fault allocation for the collision. Using the systems and methods described herein, the operation data for the remotely controlled vehicles may be analyzed to determine whether the behavior of each remotely controlled vehicle was caused, for example, by user error, a malfunction of the remote controller, the remotely controlled vehicle, or a component thereof, a malfunction of a communication link between the remote controller and the remotely controlled vehicle, or a hijacking incident. If the analysis finds, for example, that the accident was caused by a malfunction of an operation process of one of the remotely controlled vehicles, the users may not be held liable for the accident. Fault may be allocated, instead, to a manufacturer of the remotely controlled vehicle or of a component of the remotely controlled vehicle.

The allocation of liabilities may be used to determine insurance pay-outs. If a user is determined to be at fault (e.g., vehicle behavior was a result of user-entered command), the user may be personally held accountable for paying for the costs, if any, of the damage resulting from the accident. If a manufacturer of the remotely controlled vehicle or of a component of the remotely controlled vehicle is determined to be at fault, the manufacturer's insurance may be required to cover the costs of the damage. If a third-party or environment conditions are determined to be at fault, such as a failure of a communication link, adverse weather conditions, and/or a hijacking incident, the user's insurance and/or the manufacturer's insurance may partially or completely cover the costs of the damage.

The allocation of liabilities may be used to determine legal prosecution when illegal activities are identified. For example, if a remotely controlled vehicle enters a restricted area without authorization, an analysis of operation data may be performed as described herein to determine the cause of the vehicle behavior. If it is determined that the user is responsible for having entered the operation commands instructing the vehicle to enter the restricted area, the user may be prosecuted, and the operation data may be used as evidence during prosecution.

The information pertaining to the analysis may also be used to facilitate a criminal investigation related to the accident. For example, a remotely controlled vehicle may conduct illegal surveillance, and the analysis of operation data may show that the vehicle behavior was attributed to an unauthorized operation command transmitted to the remotely controlled vehicle by a hijacker. In such an instance, the user of the remotely controlled vehicle may be found to be innocent, and the recorded operation data may be used by the investigation authority to try to identify the hijacker.

The analysis of operation data as described herein may also help identify features of the vehicle that may need troubleshooting or improvement. For example, analysis of the operation data may show that a certain operation process of the vehicle, such as an engine function, is prone to errors leading to accidents. Information pertaining to the analysis may then be used to improve the design or manufacturing process of the component responsible for the operation process.

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a remotely controlled vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

For example, the propulsion system can include one or more rotors. A rotor can include one or more blades (e.g., one, two, three, four, or more blades) affixed to a central shaft. The blades can be disposed symmetrically or asymmetrically about the central shaft. The blades can be turned by rotation of the central shaft, which can be driven by a suitable motor or engine. The blades can be configured to spin in a clockwise rotation and/or a counterclockwise rotation. The rotor can be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm³, 2 cm³, 5 cm³, 10 cm³, 20 cm³, 30 cm³, 40 cm³, 50 cm³, 60 cm³, 70 cm³, 80 cm³, 90 cm³, 100 cm³, 150 cm³, 200 cm³, 300 cm³, 500 cm³, 750 cm³, 1000 cm³, 5000 cm³, 10,000 cm³, 100,000 cm³, 1 m³, or 10 m³. Conversely, the total volume of the movable object may be greater than or equal to about: 1 cm³, 2 cm³, 5 cm³, 10 cm³, 20 cm³, 30 cm³, 40 cm³, 50 cm³, 60 cm³, 70 cm³, 80 cm³, 90 cm³, 100 cm³, 150 cm³, 200 cm³, 300 cm³, 500 cm³, 750 cm³, 1000 cm³, 5000 cm³, 10,000 cm³, 100,000 cm³, 1 m³, or 10 m³.

In some embodiments, the movable object may have a footprint (which may refer to the lateral cross-sectional area encompassed by the movable object) less than or equal to about: 32,000 cm², 20,000 cm², 10,000 cm², 1,000 cm², 500 cm², 100 cm², 50 cm², 10 cm², or 5 cm². Conversely, the footprint may be greater than or equal to about: 32,000 cm², 20,000 cm², 10,000 cm², 1,000 cm², 500 cm², 100 cm², 50 cm², 10 cm², or 5 cm².

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of an movable object weight to a load weight may be greater than, less than, or equal to about 1:1. In some instances, a ratio of an movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of an movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 8:
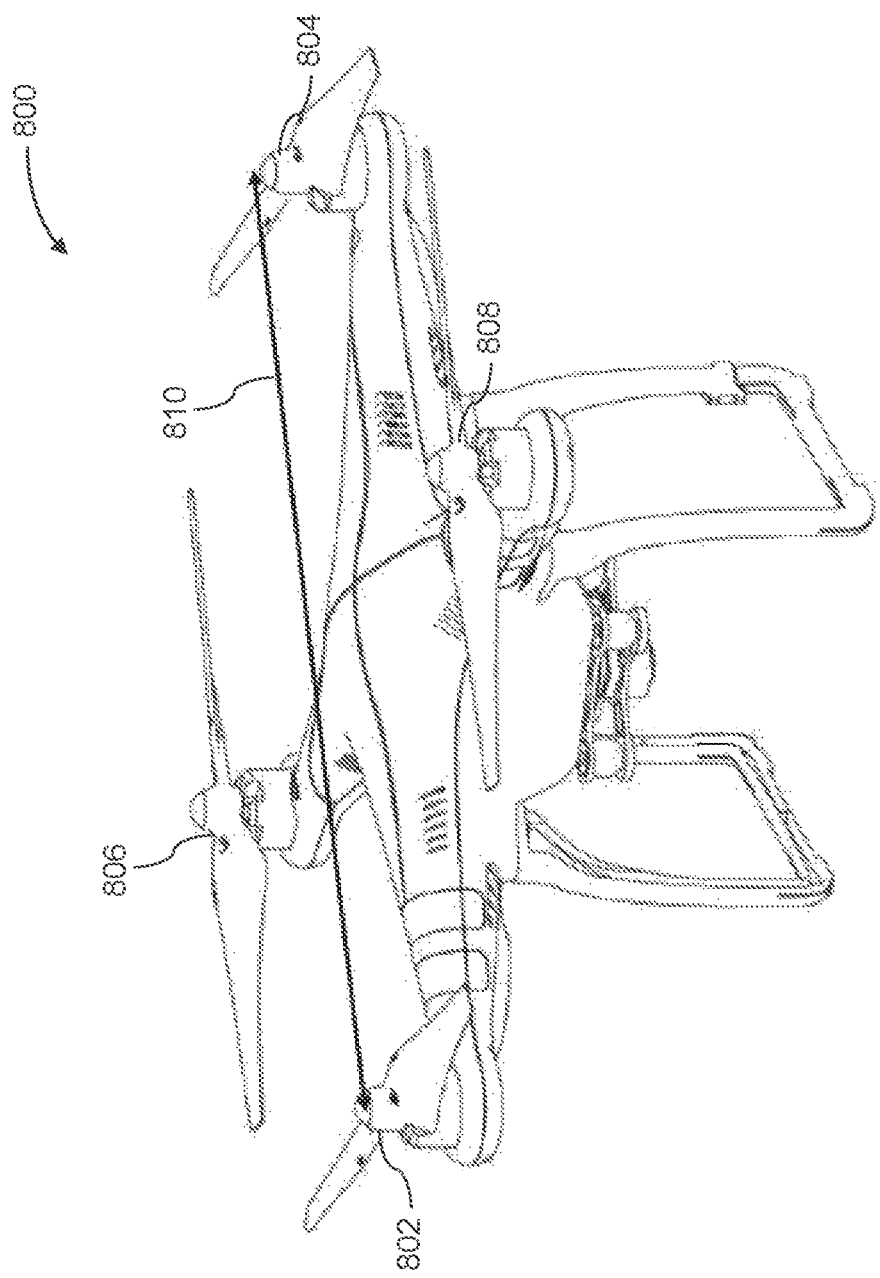
FIG. 8 illustrates an unmanned aerial vehicle, in accordance with embodiments.

FIG. 8 illustrates an unmanned aerial vehicle (UAV) 800, in accordance with embodiments of the present disclosure. The UAV may be an example of a movable object as described herein. The UAV 800 can include a propulsion system having four rotors 802, 804, 806, and 808. Any number of rotors may be provided (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length 810. For example, the length 810 can be less than or equal to 2 m, or less than equal to 5 m. In some embodiments, the length 810 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 9:
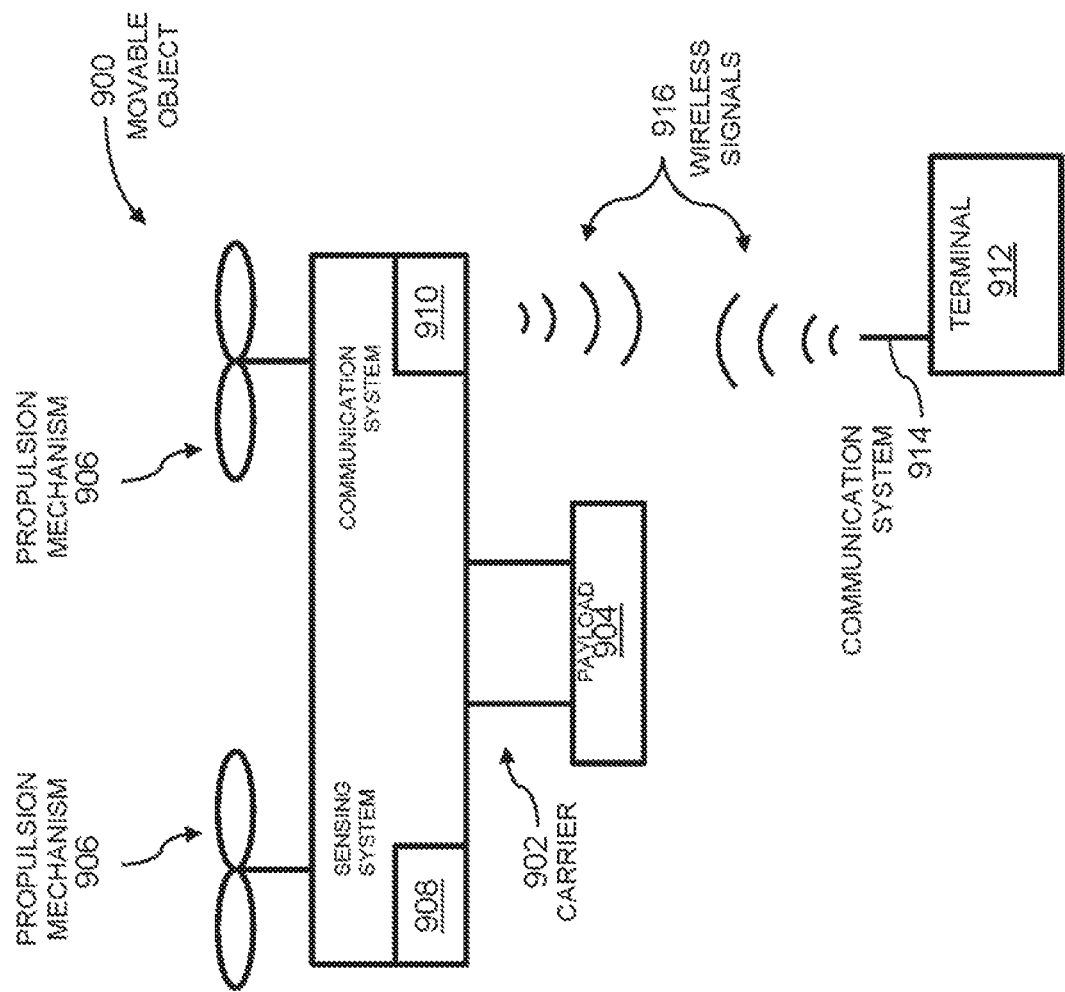
FIG. 9 illustrates a movable object, in accordance with embodiments.

FIG. 9 illustrates a movable object 900 including a carrier 902 and a payload 904, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some instances, the payload 904 may be provided on the movable object 900 without requiring the carrier 902. The movable object 900 may include propulsion mechanisms 906, a sensing system 908, and a communication system 910. The propulsion mechanisms 906 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation.

For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 908 can include one or more sensors that may sense the spatial disposition, velocity, and/or acceleration of the movable object 900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 910 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

Figure 10:
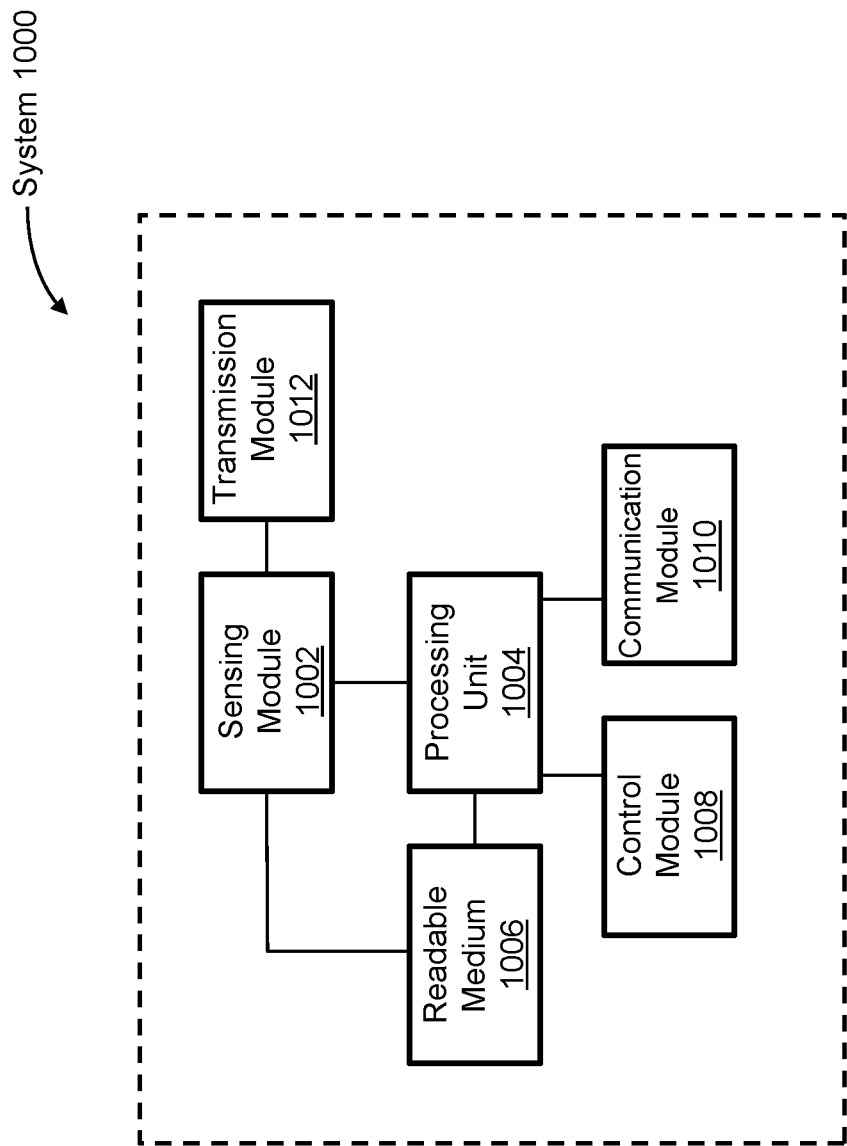
FIG. 10 is a schematic illustration by way of block diagram of a system for controlling a movable object, in accordance with embodiments.

FIG. 10 is a schematic illustration by way of block diagram of a system 1000 for controlling an movable object, in accordance with embodiments. The system 1000 can be used in combination with any suitable embodiment of the systems, devices, and methods disclosed herein. The system 1000 can include a sensing module 1002, processing unit 1004, non-transitory computer readable medium 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors. In some embodiments, the sensing module can be operatively coupled to a transmission module 1012 (e.g., a Wi-Fi image transmission module) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication, as described in further detail below. The communication module 1010 can transmit and/or receive one or more of sensing data from the sensing module 1002, processing results produced by the processing unit 1004, predetermined control data, user commands from a terminal or remote controller, and the like. In some embodiments, the communication module 1010 can be configured to implement adaptive communication mode switching, as described elsewhere herein.

The components of the system 1000 can be arranged in any suitable configuration. For example, one or more of the components of the system 1000 can be located on the movable object, carrier, payload, terminal, sensing system, or an additional external device in communication with one or more of the above. Additionally, although FIG. 10 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A device for recording user operation data for a remotely controlled vehicle, the device comprising:
    a memory off-board the remotely controlled vehicle and configured to record user operation data, the user operation data comprising outgoing operation commands that affect operation of the remotely controlled vehicle, the outgoing operation commands being received via a remote controller of the remotely controlled vehicle and transmitted to the remotely controlled vehicle; and
    a housing receiving the memory, the housing being removable from the remote controller and more resistant to destruction than the rest of the remote controller;
    wherein the device is configured to enter an accident mode that prevents updates to the user operation data recorded in the memory in response to the device being alerted that an accident condition is detected.

2. The device of claim 1, wherein the housing comprises at least one of a shock-absorbing material or a waterproof material.

3. The device of claim 1, wherein the housing comprises a tamper-evident structure comprising:
    a label adhered to a fastener of the housing and configured to be physically damaged in case of an attempt to unfasten the fastener.

4. The device of claim 1, wherein the housing comprises a tamper-evident structure comprising:
    a fastener of the housing that is coupled to an electrical circuit, a detected change to the electrical circuit resulting from an attempt to unfasten the fastener being recorded to the memory or a processing unit of the remote controller.

5. The device of claim 1, further comprising:
    a processor in communication with the memory and configured to:
        receive the outgoing operation commands from a user,
        receive an identity of the user entering the outgoing operation commands, and
        associate the user operation data with the user using the identity of the user.

6. The device of claim 1, wherein the memory comprises:
    physically separated storage regions configured to separately store the user operation data for a plurality of users; or
    digitally separated databases configured to separately store the user operation data for the plurality of users.

7. The device of claim 1, wherein the user operation data further comprises at least one of a location of a user or an identification of the remotely controlled vehicle.

8. The device of claim 1, wherein the user operation data is associated with a corresponding time.

9. The device of claim 1, wherein the accident condition comprises at least one of a loss of a global positioning system signal of the remotely controlled vehicle, a loss of a radio connection of the remotely controlled vehicle, a collision of the remotely controlled vehicle, an entry of the remotely controlled vehicle into a restricted area, a deviation of a flight path of the remotely controlled vehicle from a projected path, an abnormal acceleration of the remotely controlled vehicle, an abnormal speed of the remotely controlled vehicle, an abnormal temperature of the remotely controlled vehicle, or an indicating of poor visibility by data from a vision sensor of the remotely controlled vehicle.

10. The device of claim 1, wherein the device is further configured to exit the accident mode in response to receiving instructions that the accident condition has been resolved.

11. The device of claim 10, wherein the instructions are issued by a user having special privileges or authorization.

12. The device of claim 1, wherein the outgoing operation commands affect positioning of a payload on-board the remotely controlled vehicle with respect to the rest of the remotely controlled vehicle.

13. A system for data recording comprising:
the device of claim 1; and
a vehicle operation data recorder having a memory on-board the remotely controlled vehicle and configured to record vehicle operation data, the vehicle operation data comprising incoming operation commands that affect operation of the remotely controlled vehicle, the incoming operation commands being received by the remotely controlled vehicle from the remote controller of the remotely controlled vehicle.

14. A remote controller comprising:
a device for recording user operation data for a remotely controlled vehicle, the device comprising:
a memory off-board the remotely controlled vehicle and configured to record user operation data, the user operation data comprising outgoing operation commands that affect operation of the remotely controlled vehicle, the outgoing operation commands being received via a remote controller of the remotely controlled vehicle and transmitted to the remotely controlled vehicle; and
a housing receiving the memory, the housing being removable from the remote controller and more resistant to destruction than the rest of the remote controller;
wherein the device is configured to enter an accident mode that prevents updates to the user operation data recorded in the memory in response to the device being alerted that an accident condition is detected;
a user interface configured to receive the outgoing operation commands and to control operation of the remotely controlled vehicle; and
a transmitter configured to transmit the outgoing operation commands from the remote controller to the remotely controlled vehicle.

15. A method for recording user operation data for a remotely controlled vehicle, the method comprising:
receiving, through a user interface of a remote controller, outgoing operation commands, the remote controller comprising a user operation data recorder remote to the remotely controlled vehicle;
recording the user operation data to a memory of the user operation data recorder, the user operation data comprising the outgoing operation commands; and
causing the user operation data recorder to enter an accident mode that prevents updates to the user operation data recorded in the memory in response to an alert that an accident condition is detected,
wherein the memory is received in a housing that is removable from the remote controller and more resistant to destruction than the rest of the remote controller.

16. The method of claim 15, further comprising:
receiving an identity of a user entering the outgoing operation commands; and
associating the user operation data with the user using the identity of the user.

17. The method of claim 15, wherein recording the user operation data to the memory comprises:
separately storing the user operation data for a plurality of users to physically separated storage regions of the memory, or
separately storing the user operation data for the plurality of users to digitally separated databases of the memory.

18. The method of claim 15, wherein the accident condition comprises at least one of a loss of a global positioning system signal of the remotely controlled vehicle, a loss of a radio connection of the remotely controlled vehicle, a collision of the remotely controlled vehicle, an entry of the remotely controlled vehicle into a restricted area, a deviation of a flight path of the remotely controlled vehicle from a projected path, an abnormal acceleration of the remotely controlled vehicle, an abnormal speed of the remotely controlled vehicle, an abnormal temperature of the remotely controlled vehicle, or an indicating of poor visibility by data from a vision sensor of the remotely controlled vehicle.

19. The method of claim 15, further comprising:
causing the user operation data recorder to exit the accident mode in response to
receiving instructions that the accident condition has been resolved.

* * * * *